United States Patent [19]

Kanno et al.

[11] Patent Number: 5,019,476
[45] Date of Patent: May 28, 1991

[54] OPTICAL RECORDING MEDIUM

[75] Inventors: Toshiyuki Kanno, Tokyo; Naoyuki Ueno, Machida; Seiji Kondo, Hachioji; Yasuji Nagata, Hachioji; Jun Kanehira, Hachioji; Hideshi Takahashi, Hachioji; Yoshiko Uematsu, Atsugi, all of Japan

[73] Assignee: Olympus Optical Co., Ltd., Tokyo, Japan

[21] Appl. No.: 435,946

[22] Filed: Nov. 13, 1989

[30] Foreign Application Priority Data

Nov. 16, 1988 [JP] Japan ................................ 63-289733
Nov. 21, 1988 [JP] Japan ................................ 63-292461
Dec. 28, 1988 [JP] Japan ................................ 63-333500

[51] Int. Cl.$^5$ ........................ G02F 1/13; C09K 19/02
[52] U.S. Cl. ........................................ 430/20; 430/19; 430/495; 430/945; 428/64; 428/1; 346/135.1
[58] Field of Search ............... 430/19, 20, 945, 495; 428/1; 346/135.1

[56] References Cited

U.S. PATENT DOCUMENTS

| | | |
|---|---|---|
| 4,702,945 | 10/1987 | Etzbach et al. ........................ 428/1 |
| 4,752,820 | 6/1988 | Kuroiwa et al. ................. 346/135.1 |
| 4,857,427 | 8/1989 | Itoh et al. ............................. 430/19 |

FOREIGN PATENT DOCUMENTS 60-179294  9/1985  Japan ................................ 430/20

Primary Examiner—Charles L. Bowers, Jr.
Assistant Examiner—Ashley I. Pezzner
Attorney, Agent, or Firm—Frishauf, Holtz, Goodman & Woodward

[57] ABSTRACT

An optical recording medium such as an optical disk, which is capable of reversibly repeating a recording/-erasing cycle. This optical recording medium comprises a transparent substrate and recording layer formed on the substrate. This recording layer comprise a liquid crystalline high polymer having side chains and a dyestuff having a recording-light absorbing property. The side chain may preferably comprises mesogen group, a monocyclic or polycyclic compound such as phenyl, benzyl, naphthyl or anthryl group, and alkyl or aryl group having 1 to 18 carbon atoms.

17 Claims, 4 Drawing Sheets

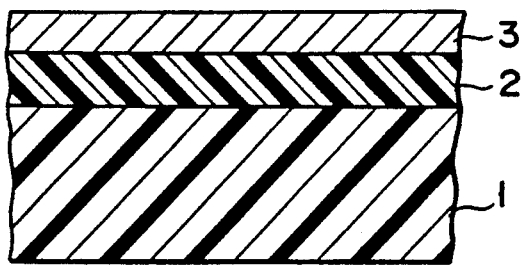
F I G. 1
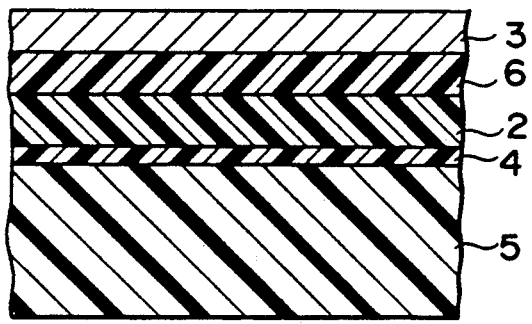
F I G. 2
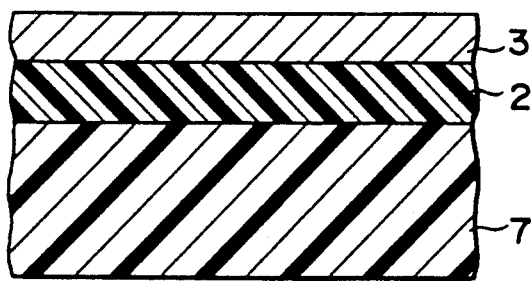
F I G. 3
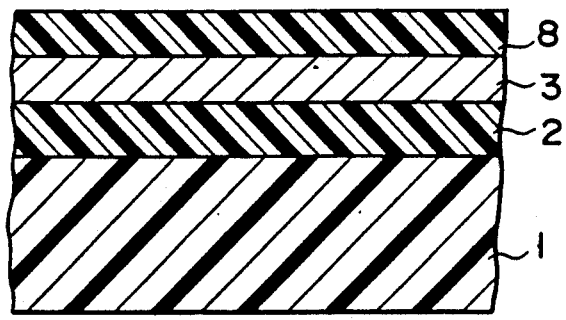
F I G. 4
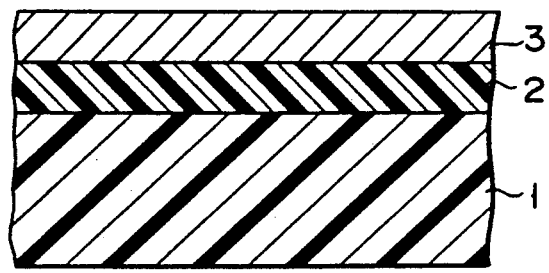
F I G. 5
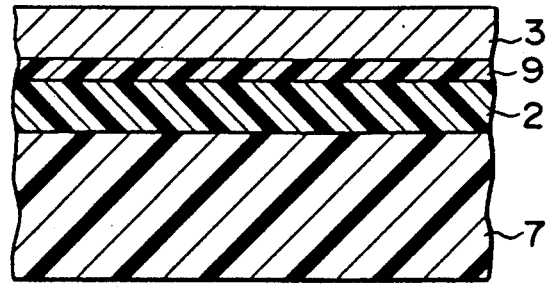
F I G. 6

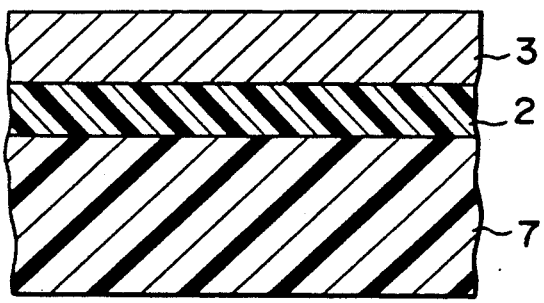
F I G. 7
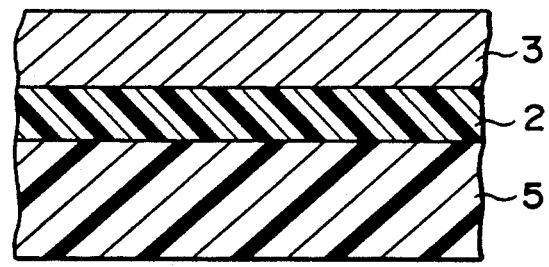
F I G. 8
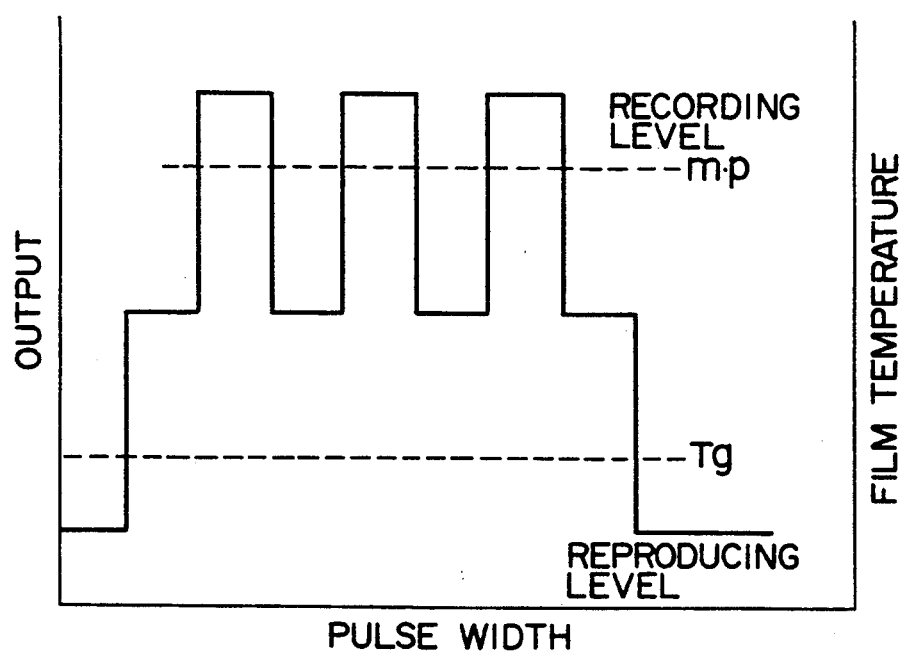
F I G. 9

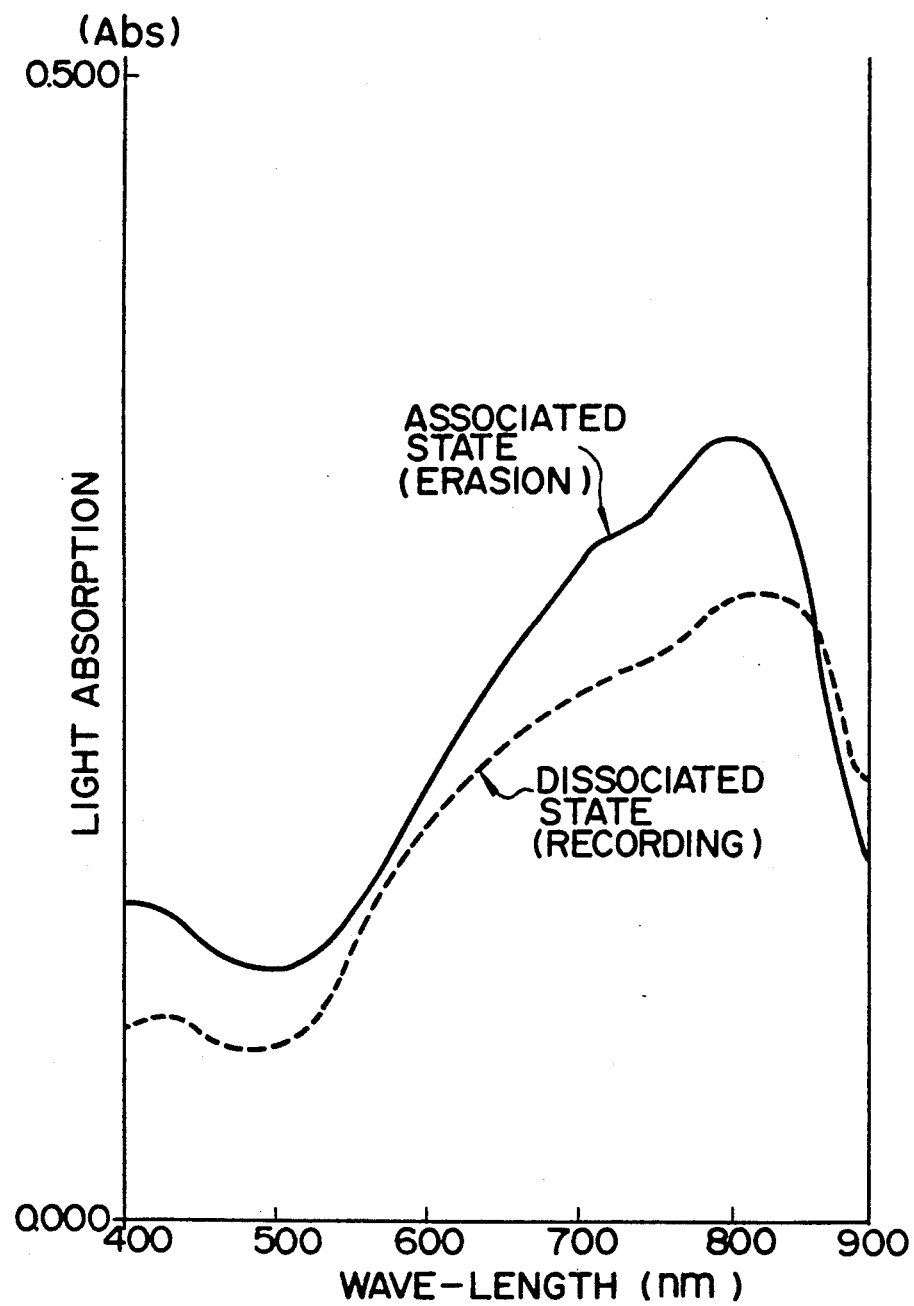
F I G. 10

OPTICAL RECORDING MEDIUM

BACKGROUND OF THE INVENTION

1. Field of the Invention

The present invention relates to an optical recording medium such as an optical disk, an optical card, and an optical tape, in which molecular rotation, or state changes such as molecular agglomeration and arrangement of a polymer compound chain are caused, and a light-absorbing compound causes association and dissociation with respect to the chain to largely change mutual optical characteristics between the two compounds, thereby amplifying information and reversibly repeating recording/erasure thereof.

2. Description of the Related Art

Recently, as laser techniques have progressed, optical recording media for writing, reading, and erasing information by using laser light have been extensively studied. A recording mechanism of such an optical recording medium is classified into (1) a photon mode type (former) which utilizes photons of light, and (2) a heat mode type (latter) which utilizes light as heat.

The former has attracted attention as a high-sensitivity and high-speed optical recording medium and was proposed as an optical recording medium consisting of a photochromic material such as spiropyrane [Published Unexamine Japanese Patent Application No. 61-17037, the 50th Japan Chemical Society Spring Annual Meeting Drafts Vol. 1, P. 259(85)], fluguide, indigo [Published Unexamined Japanese Patent Application No. 61-128244, J chem Soc, Perkin Trans, 1, 197(81), 2,341(81)], and diallylethene (Published Unexamined Japanese Patent Application No. 63-24245). Although this medium has the above characteristics, it causes a reverse photochromic reaction or causes a side reaction upon writing since a photochromic reaction is used in both writing and reading. In addition, since the medium has only a low light resistance with respect to reproducing light, its stability and repeating property in a color producing state are poor. Furthermore, this optical recording medium has a poor storage stability, i.e., it has a serious problem in reliability and the like as an optical recording medium. Therefore, the optical recording medium of this type is far from practical applications although it has been extensively studied.

The latter heat mode type optical recording medium causes local melting, evaporation, thermal deformation, thermal transition, and the like when recording light is radiated on a recording layer, and performs recording and reproduction by using the obtained optical change. A conventional example of the optical recording medium of this type is a photomagnetic recording medium consisting of a magnetooptic material, e.g., TbFe, GdFe, TbFe, or TbFeCo, which utilizes a magnetooptic effect such as a Faraday effect or a Kerr effect. Since, however, it is difficult to perform high-speed overwrite by using this medium, an inorganic optical recording medium consisting of, e.g., TeOx, Te-Ge, Te-Ge-Sb, and Te-Ge-Sb-Tl containing a calgon element, a typical element of which is Te by Ovshibsky, has been conventionally proposed. Since, however, the optical recording medium consisting of such an inorganic material is manufactured by sputtering a multimetal compound by using a noxious material, its stability is low. Therefore, it is difficult to obtain a non-toxic and inexpensive optical recording medium having high reliability. In addition, in terms of medium characteristics of this optical recording medium, recording sensitivity is low, and stability, high-speed erasability, and overwrite performance in a recording state are insufficient. Therefore, a demand has arisen for a medium which can be manufactured by a simple method, which is non-toxic and inexpensive, and which has high reliability, a high speed, and high sensitivity.

In order to eliminate the above drawbacks, an optical recording medium consisting of an organic polymer material has been extensively studied since it is non-toxic, can be manufactured at low cost, and has high sensitivity. Examples of the optical recording medium of this type are recording performed by repeating pit formation-flattening using the above photochromic material or a thermoplastic polymer and a near-infrared absorbing dye (Published Unexamined Japanese Patent Application No. 58-48245) and phase separation of a polymer blend. These examples, however, have poor sensitivity and repeating property. A cell structure obtained by sealing a polymer liquid crystal between a pair of electrodes is disclosed as an optical recording medium utilizing phase transition as a recording principle and using a liquid crystal material in some conventional methods (Polym Commun. 24,364, 1983, Published Unexamined Japanese Patent Application Nos. 59-10930, 60-114823, and 60-166481). In these methods, however, electrodes are required, and a medium arrangement is complicated. In addition, a S/N ratio and a speed are insufficient. Examples of the polymer liquid crystal are a system applying a backbone liquid crystal polymer (Published Unexamined Japanese Patent Application Nos. 61-28004 and 62-175939) and a side chain liquid crystal polymer (Germany, Oftn DE3500838 Al) obtained by a method in which a liquid crystal polymer described in Macromolecules, 17, 1004 to 1009, 1984, Advanced in Polymer, 59, 37, 1984 is utilized and a domain layer of light scattering is formed into an isotropic layer by heat generated by light radiation and immobilized, and a system in which an absorber is further added to the polymer (Published Unexamined Japanese Patent Application No. 58-125247). This optical recording medium is, however, unsatisfactory in recording sensitivity, contrast, a repeating property, and recording storage stability, and cannot be put to practical use as an optical recording medium in terms of a response characteristic. In order to improve the response characteristic, a method is proposed (Published Unexamined Japanese Patent Application No. 63-98852) in which a photochromic molecule such as azobenzene is bonded to a side chain of polypeptide having lyotropic liquid crystal layer utilizing a relationship between a liquid crystal and an optical reaction or is mixed with the polypeptide, thereby utilizing photoisomerism. This method, however, has difficult practical problems in contrast, a repeating property, and memory storage stability as a recording medium since it has sensitivity at a shorter wavelength than a semiconductor wavelength which is industrially utilized. Therefore, no satisfactory recordable/erasable optical recording medium has been obtained.

SUMMARY OF THE INVENTION

The present invention has been made in consideration of the above situation and has as its object to provide an optical recording medium which has sufficient performance in recording, reproduction, and erasure, and which can improve contrast, a response characteristic, and memory storage stability.

The present invention is an optical recording medium comprising:

a transparent substrate; and a recording layer, formed on the transparent substrate, and containing at least one type of a liquid crystal polymer compound having molecular rotation power or power of changing a state such as an agglomeration or an arrangement at a side chain thereof, and a dye compound having absorbing power for recording light, wherein upon radiation of recording light on the recording layer, affinity and association are induced or state changes in dissociation and separation are induced due to differences in chemical and physical characteristics such as a glass transition point and a melting point between the side chain of the polymer compound and the dye compound to change mutual optical characteristics, thereby reversibly accumulating/erasing optical information and reading the optical information by utilizing the optical changes.

An example of the liquid crystal polymer compound is a side chain type liquid crystal polymer represented by the following formula (I), has a mesogen group at side chain portions Y and Y' thereof via a flexible spacer, and has

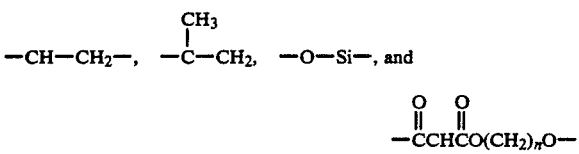

(n=2 to 9) at backbone portions X and X':

   (I)

wherein $30 \leq 1+m \leq 5,000$ and $1/m = 10$ to $100/90$ to 0.

Another example of the liquid crystal polymer compound is a polypeptide-based polymer liquid crystal having a liquid crystal functional group at its side chain.

In addition, a side chain group having a structure in which a spatial structure is obtained between side chain groups so that suitable miscibility with the dye compound is obtained or the dye compound can easily enter between the side chain groups may be introduced in the liquid crystal polymer compound. For example, an aliphatic compound such as alkyl or aryl having 1 to 18 carbon atoms; or a (non)substituted monocyclic or polycyclic compound such as phenyl, benzyl, naphthyl, or anthryl may be introduced in an amount of 0.01 or more per side chain group.

This invention further provides an erasable optical recording medium comprising a substrate and a recording layer consisting essentially of a liquid crystalline high polymer material such as a polyglutamate derivative and a low molecular liquid crystal compound, which preferably has properties of promoting orientation of side chains of said polyglutamate derivative, and improving CN ratio, erasing ratio, sensitivity and response speed during recording, said low molecular liquid crystal being contained at a weight ratio of 1/20 to ½ per weight of said polycrystalline high polymer such as a polyglutamate derivative. The side chain of the polyglutamate derivative may contain alkyl group, aryl group, phenyl group, benzyl group, naphthyl group, anthryl group or liquid crystalline methogen having 1-18 carbon atoms.

The recording layer may also contain a light absorptive dyestuff at a weight ratio of 5/100 to 1/5 per weight of the liquid crystalline high polymer.

In the present invention, in order to control an interaction between and changes in molecular states of a side chain and a dye compound induced by light radiation and to make them reversible, the above polymer compound preferably contains a polymer in which a mesogen group is bonded via a spacer having a flexible molecular group so that the polymer compound easily, reversibly changes a coil-like conformation with high reproducibility or a high-speed change is obtained.

It has been found that when a designing of the molecular structure 1 is performed by introducing into side chain portions of a peptide compound having a stiff backbone chain, a long chain alkyl derivative or a copolymer having side chains remarkably different in length from each other, it is possible to promote the degree of freedom of configuration or movement of the side chains (side chain solvent effect) and to invest the peptide compound with a phase transferability.

Further, it has been found that when mesogen group is introduced into side chain portions of a peptide compound, the mobility and orientation of said chains with respect to the backbone chain can be much promoted, and at the same time, the physical reactions between the side chains and the dyestuff coexisting in the recording layer, such as affinity, association, dissociation, coagulation and separation can be more easily and effectively triggered.

Examples of the side chain groups which promote the free movement of the side chains are long chain alkyl groups such as $(CH_2)_m$, i—$C_mH_{2m}$—, —$C_mH_{2m-2}$, or $C_mH_{2m-4}$ wherein $3 \leq m \geq 37$, preferably $7 \leq m \geq 18$, cyclic compounds such as

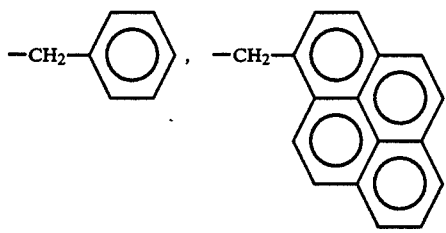

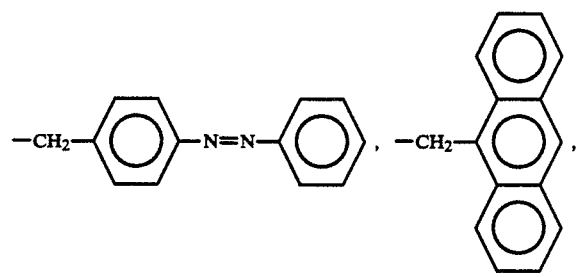

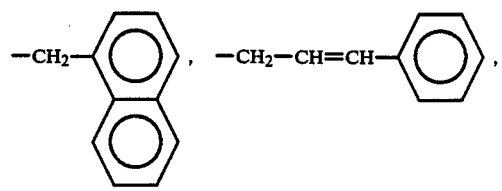

-continued

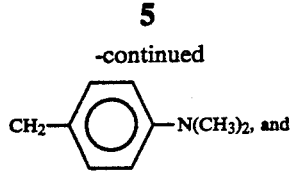

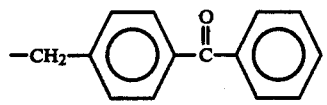

Further when a copolymer having side chains different in length from each other by 4 to 6 or more carbon atoms is introduced into the peptide compound, it gives more space and more free movement to the peptide compound, thereby promoting the interaction with a dyestuff. The introduction of the cyclic compounds as mentioned above can be performed by an ester exchange reaction or a coupling reaction.

Introduction of a mesogen group (liquid crystal group) into the side chain portion of the liquid crystalline high polymer is effective in not only promoting the regularity of the movement of the side chain portions, but also the orientation speed of the side chain portions, in controlling the steric configuration of the whole molecule, and in increasing the degree of polarization.

A basic concept of the present invention is that heat or light energy absorbed by a dye compound at a high efficiency upon radiation of recording light is applied on a polymer compound, its side chains are rotated, or regularly moved, e.g., agglomerated or arranged to change an interaction with the surrounding dye compounds or an interaction between the dye compounds, thereby inducing a three-dimensional chemical change or an electron state in a recording layer to reversibly record/erase optical information.

The recording scheme according to the present invention basically differs from a conventional photochemical information recording scheme in the following points.

(1) In the conventional method, in a system using a polymer matrix and a dye compound for recording, reproducing, and erasing information, a change largely depends on one of the polymer matrix and the dye compound, and the remaining one only has an assisting effect. For example, an optical change depends of a photochromic molecule, and a matrix molecule is used to only completely maintain the state. In the conventional method, therefore, drawbacks as medium characteristics of the polymer matrix material or the dye compound cannot be completely eliminated. In the present invention, however, since a change for accumulating information is performed by an interaction between the polymer compound and the dye compound, a medium does not reflect drawbacks of the individual materials. That is, by combining a material having no reversibility but a high response characteristic with a material having reversibility, a medium having good characteristics of the both materials can be realized. That is, a high-speed, reversible molecular arranging capacity is obtained by an interaction between the side chain portion of the polymer compound and the dye. The next difference is as follows.

(2) In the conventional reversible optical information recording scheme, when accumulated information is to be reproduced as a change amount of absorbance, stability is insufficient upon reproduction of the optical information since a light wavelength range for recording the optical information coincides with the wavelength of light for reproduction/readout. That is, the accumulated optical information is degraded by absorption of reproducing light. In the present invention, however, since a temperature at which the change is started has a clear threshold value such as a transition point (Tg) and a melting point (m.p.) of the polymer compound, optical information can be reproduced without any degradation by adjusting the power of reproducing light. In addition, an electron state or a three-dimensional optical change obtained by the interaction occurs throughout a wide wavelength range. Therefore, reproducing light having a wavelength range entirely different from writing light can be used as monitoring light.

Characteristics of the polymer compound and the dye compound change in accordance with the form of an interaction as described in items ((i) to (ii)) below.

(i) Interaction by Intermolecular Force When a dye compound having a $\pi$ electron cloud such as an indole-based cyanine dye, an anthraquinone-based dye, an azo-based dye is homogeneously mixed with a polymer compound having a ring such as phenyl or biphenyl at its side chain portion, an overlap of an electron cloud is generated between the side chain portion of the polymer compound and the dye compound, thereby causing an interaction. When a long-chain alkyl group having 1 to 37 carbon atoms is introduced in the end of a dye compound at a side chain portion of a polymer compound, an intermolecular interaction acts on an alkyl moiety.

(ii) Interaction via Hydrogen Bond

By introducing a functional group —OH, —COO, =O, or —NH in the end of a side chain portion of a polymer compound and a functional group —OH, —COO—, =O, or —NH in the end of a dye compound, a hydrogen bond can be formed between the two compounds. A metastable energy level is obtained and a spectral curve changes by a three-dimensional positional relationship between the two compounds obtained by this hydrogen bond.

(iii) Interaction by Interion Association

When a dye having high ionicity such as a cyanine-based dye or a thiol-based complex dye is dispersed in a polymer matrix for causing an intermolecular polarization, an atmospheric bonding form (association) can be obtained with respect to an ambient space. For example, when a polyglutamic acid-based polymer is used as a polymer matrix and an indole-based cyanine dye is used as a dye, association occurs. As a result, a three-dimensional positional relationship is changed to change a spectral curve as in item (ii) above.

(iv) Interaction by Molecular Shape

By controlling the length and the shape of a side chain portion of a polymer compound and those of a dye compound, an interaction can be controlled. That is, when a polymer compound and a dye compound are mixed, an interaction changes in accordance with whether the dye compound enters between side chains, and the two compounds can be set close to a clathrate state. Such a change occurs when long chains are given to a polymer compound and a dye compound, and the molecular shape of a dye compound is formed into a rod.

The above interaction is an interaction (association, affinity and separation, dissociation) between a side chain group of a polymer compound and a substituting group of a dye compound and between molecular shapes, and accompanied with an optical change. The interaction, however, may be an interaction between dye compounds (an azo-based dye, an anthraquinone-based dye, an Ni thiol complex-based dye, a cyanine-based dye, a merocyanine-based dye, and a naphthoquinone based dye) I, or between the dye compound I and a dye compound II of the present invention. FIG. 10 is a graph showing wavelength-absorbance characteristics in an association state and a dissociation state. Such an interaction can be adjusted by controlling heating/cooling conditions of a recording layer. That is, by heating up to a temperature higher than a melting point, a backbone portion of a polymer compound is moved so that side chain portions cannot be arranged upon rapid cooling. On the contrary, when heating is performed up to a temperature higher than a transition point and lower than a melting point and then slow cooling is performed, side chain portions are arranged. In this case, a dissociated or three-dimensional positional change can be obtained by differences in melting points, physical characteristics such as flowability upon melting, and chemical characteristics such as crystallinity and cohesiveness of the polymer compound and the dye compound, and the above interaction change can be controlled accordingly. In addition, one-beam overwrite can be performed by using a laser pulse as shown in FIG. 9.

In order to reduce the interaction, a portion of interest is heated up to a temperature higher than a transition point (or a melting point) and dissociated by differences in the melting points, physical characteristics such as flowability upon meting, and the chemical characteristics such as crystallinity and cohesiveness between the two compounds.

Examples of a material to be used as a polymer compound according to the present invention are resins such as polystyrene, polyvinyl acetate, polyvinyl chloride, polycarbonate, polymethyl methacrylate, nylon, and polyglutamic acid. The material preferably has a liquid crystal group as shown in the attached sheet in its side chain in terms of reversibility, or contain at least one type of a glutamic acid derivative liquid crystal. Examples of the polymer compound according to the present invention are represented by the following formulas (1), (2), and (3):

$$\leftarrow X\rightarrow_l\leftarrow X'\rightarrow_m \atop Y \quad\; Y' \qquad (1)$$

wherein each of X and X' independently represents $$-CH-CH_3-, \quad -\underset{\underset{CH_3}{|}}{\overset{\overset{CH_3}{|}}{C}}-CH_2-, \quad -O-Si,$$

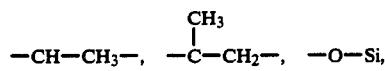

$30 \leq l+m \leq 5,000$, $l/m = 10$ to $100/90$ to $0$, and $n = 2$ to $9$.
A. side chain portion Y or Y' is given by:

Y or Y'=A— B— C wherein A represents a spacer portion, B represents a mesogen portion, and C represents an end group. The spacer portion A is represented by (a) and (b).

(a) is $\leftarrow CH_2\rightarrow_{\overline{n}}$, $\leftarrow (CH_2)_n-O\rightarrow_{\overline{m}}$, $\leftarrow O\leftarrow CH_2)_n\rightarrow_{\overline{m}}$ $n = 0$ to $12$, $m = 1$ to $5$ (b) is $-\overset{\overset{O}{\|}}{C}O-$, $-O\overset{\overset{O}{\|}}{C}-$, $-\overset{\overset{O}{\|}}{C}C-$, $-CH=N-$, $-N=CH-$,

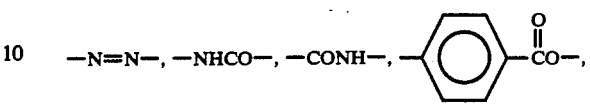

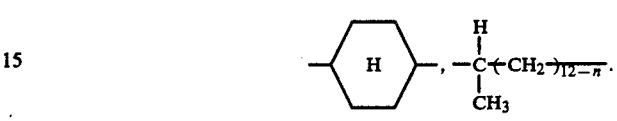

Note that at least one portion can be arbitrarily selected as (a).

The mesogen portion B is represented by a—b—a' and selected from the following groups.

Group a, a';

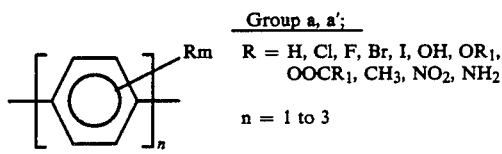

R = H, Cl, F, Br, I, OH, OR$_1$, OOCR$_1$, CH$_3$, NO$_2$, NH$_2$ n = 1 to 3

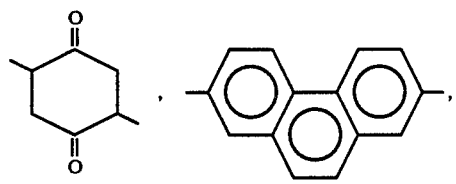

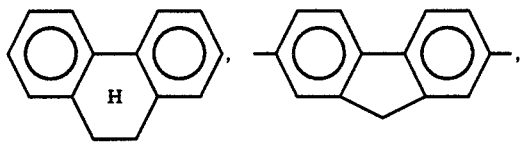

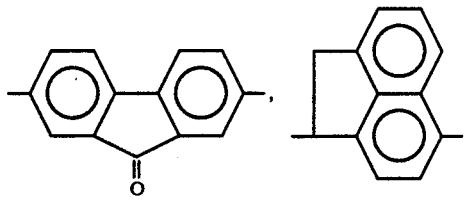

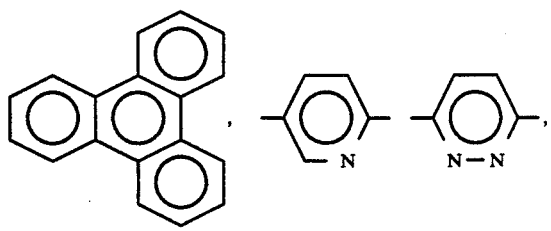

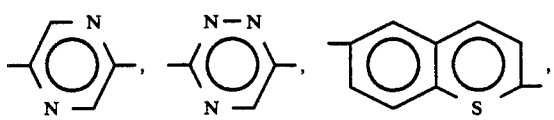

-continued

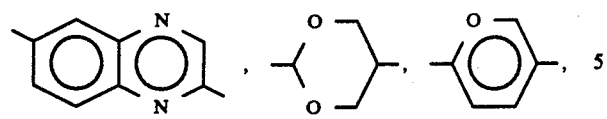

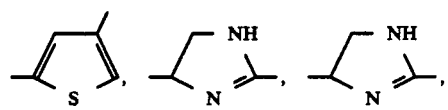

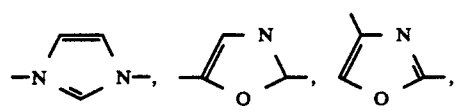

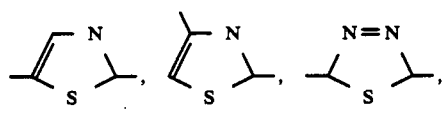

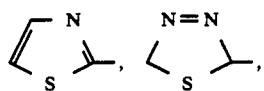

(Y, Y' = H, OCH₃, CN)

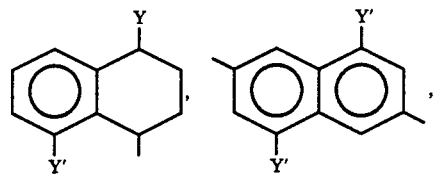

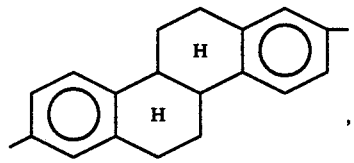

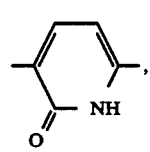

Group b:

—, —CH=N—, —N=CH—, —N=N—, —CC—,

—CH=CH—, —O—C(=O)—, —CC—, —CH=CH—,

—C(=O)—NH—, —NH—C(=O)—, —CH=CH—CH=N—,

-continued

—CH=CH—C(=O)—O—, —CH=N—N=CH—,

—OOC(CH₂)ₙCOO—, —CH=C((CH₂)ₙC(=O))=CH—,

—Hg—, —N=C=N—, —O—, —NH—, (CH₂)ₙ,

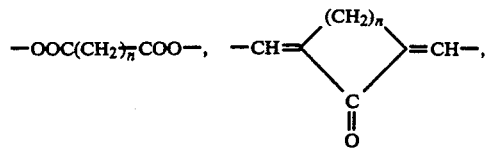

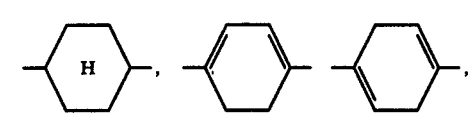, —C(X)=N— (X = H, Cl, Br, F, OH), —CH=N—,

—CH₂—O—, —CH₂—NH—, —CH=CH—C(=O)—,

—CH=N—NH—, —C(=O)—O—O—C(=O)—,

—CH=CH—CH=CH—, —C(=O)—CH=CH—C(=O)—,

—C(=O)—CH₂—CH₂—C(=O)—, —N—CH=CH—N—,

—NH(CH₂)ₙNH—, —O(CH₂)ₙO—, —COO(CH₂)ₙOOC—, (CH₂)ₙCOO—, —C(=O)—O—N=CH—,

—C(=O)—O—N=C(R)—, (R = an alkyl or allylalkyl group having 1 to 6 carbon atoms)

—C(=O)—S—, —S—O, —C(=O)—Se—,

—N=N—CH=CH—N=N—, —CH=CH—C(=O)—CH=CH—

(wherein n = 1 to 6)

Note that the mesogen portion may be the following compounds:

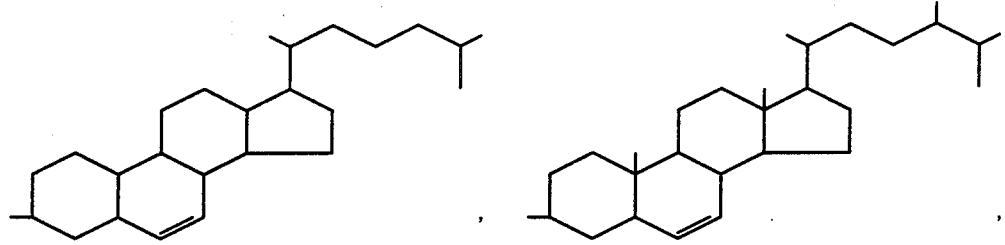
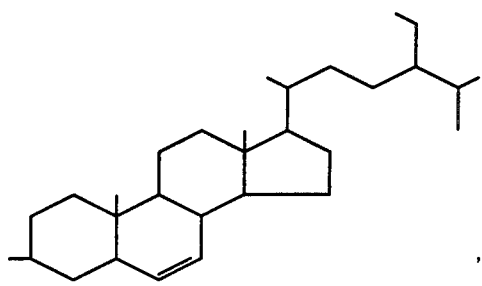
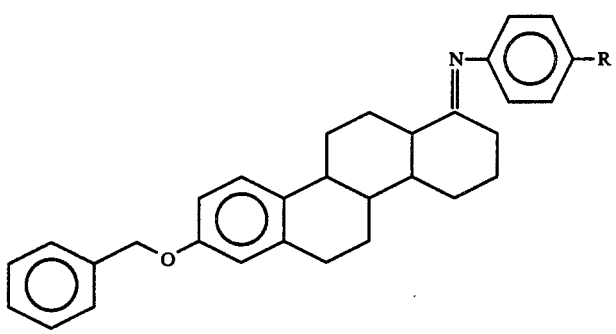
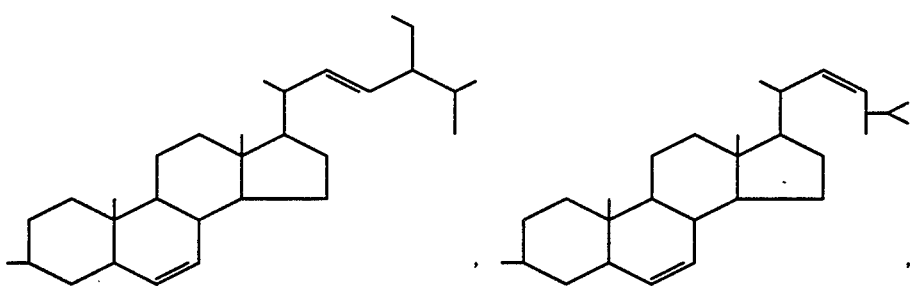
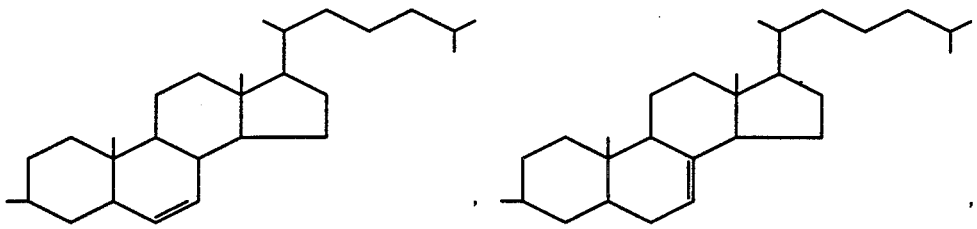
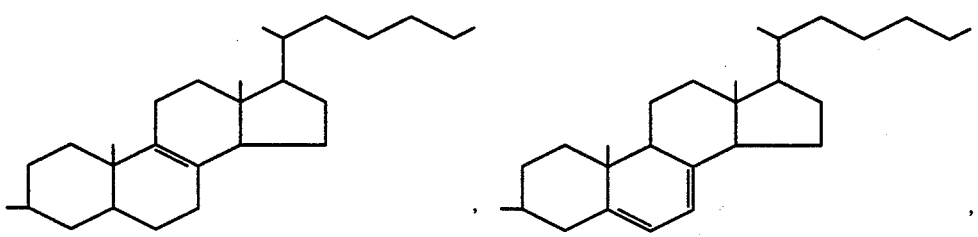

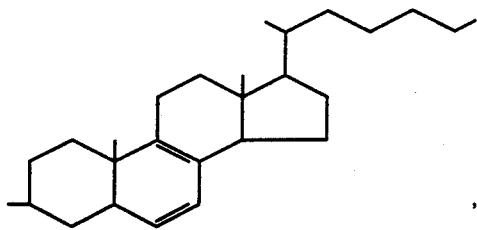
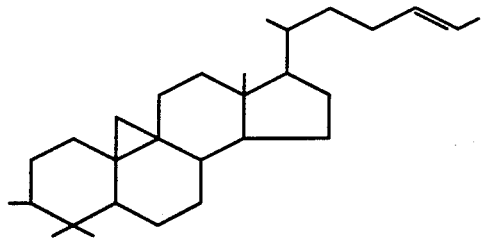

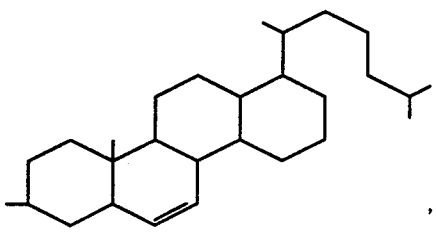

The end group C can be selected from the following group:

—OR, —R, —COOR, —OOCR, —OOCOR, —CN, —Cl, —NO$_2$, —COR, —CH=CH—COOR, —H, —F, —Br, —I, —N≡C, —N=C=O, —N=C=S, —N$_3$, —R′, —OH, —OR′, —OCOR′, —COR′, —COOR′, —CS=CY—COOR, —NH$_2$, —NHR, —NR$_2$, —NHCHO, —NHCOR, —SR, —COSR, —OCOSR, —HgCl, —HgOCOCH$_3$, —OCF$_3$, —Rsi, —O—(CH$_2$)$_n$OR, —CH$_2$CH$_2$OH,

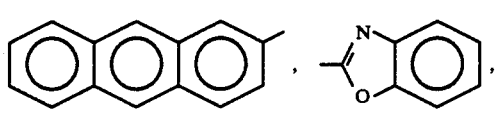

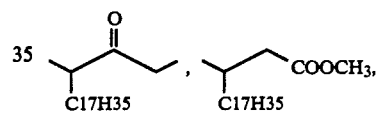

—CH=CH—COOR, —(O—CH$_2$—CH$_2$)$_n$OCH$_3$, n=1 to 3, —SO$_3$Na,

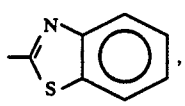

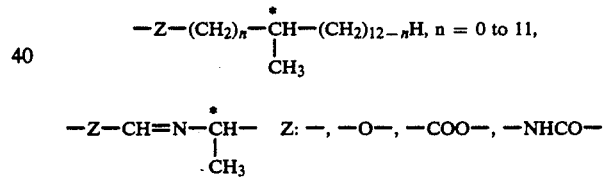

—Cl —NH$_3$Cl,

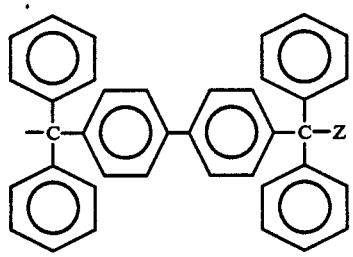

—COOM m=Li Na, K, Ti, wherein X and X′, and Y and Y′ may be different.

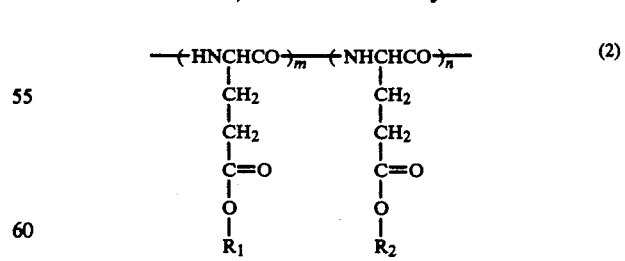

wherein $R_1 = CH_3$ or $C_2H_5$, $R_2$ is selected from the group consisting of an alkyl group, an aryl group, an araylalkyl group, and a cycloalkyl group, each having 6 to 12 carbon atoms, m/n=30 to 70/70 to 30, and $100 \leq 1+m \leq 1,000$.

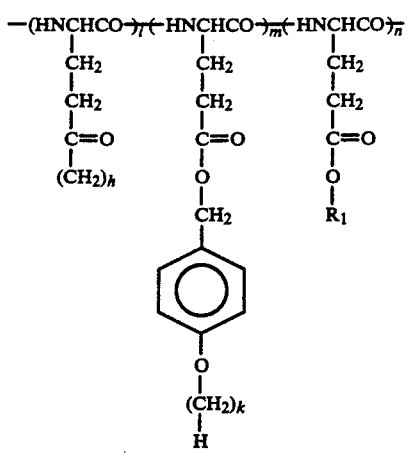

(3)

wherein $R_1$ is selected from the group consisting of an alkyl group, a cycloalkyl group, an aryl group, and an arylalkyl group, each having 1 to 12 carbon atoms, $(l+m)/n = 30$ to $70/70$ to $30$, $100 \leq l+m+n \leq 1,000$, $h = 1$ to $5$, and $k = 1$ to $6$.

The above examples of the liquid crystal polymer are represented by formulas ① to ⑮ listed in Table 3 to be presented later. These liquid crystal polymers have a solid phase at room temperature and therefore need not be sealed in a cell unlike in a conventional method. The transition temperature of the liquid crystals is 40° C. to 350° C., and preferably, 60° C. to 250° C. in terms of sensitivity and durability. If the transition temperature is lower than 40° C., the durability is degraded. If the transition temperature is higher than 350° C., the response characteristic (sensitivity) is degraded. The above liquid crystal polymers can be used singly or in a combination of two or more thereof.

A recording layer according to the present invention is sometimes constituted by a liquid crystal polymer and a laser-light-absorbing dye. In this case, the dye preferably has high absorptive power with respect to near-infrared light as an oscillation wavelength range of a system semiconductor laser. Examples of such a dye are, as described in Table 1, a cyanine-based dye (Published Unexamined Japanese Patent Applications Nos. 58-112790 and 58-125246, USP 11896, and USP 18946), a merocyanine-based dye (Published Unexamined Japanese Patent Application Nos. 58-212634 and 58-11790), a naphthophthalocyanine-based dye (Published Unexamined Japanese Patent Application Nos. 61-291187, 61-268487, 61-177281, 61-177288, 61-186384, 62-56191, 61-25886, and 61-197280, and USP 879470), a pyrylium-based dye (Published Unexamined Japanese Patent Application Nos. 58-181688 and 58-181689), a naphthoquinone-based dye (Published Unexamined Japanese Patent Application No. 59-20124), an anthraquinone-based dye, and an azo-based dye. These dyes may be used singly or in a combination of two or more thereof. The dye is preferably, easily miscible with one or both of Y and Y' in formula (I) of the liquid crystal polymer. A cyanine-based dye is most preferable. The concentration of the dye with respect to the liquid crystal polymer is 0.05 to 50 wt %, and preferably, 0.5 to 2.0 wt %. If the concentration is lower than 0.1 wt %, the contrast and the response characteristic are degraded. If the concentration exceeds 50 wt %, the stability and the reversibility of the recording layer are degraded.

In the present invention, predetermined amounts of the liquid crystal polymer and the dye are weighed and mixed in a carbon halide such as chloroform or 1,2-dichloroethane or a ketone-based solvent such as acetone or MEK to obtain a solution. The solution is coated on a substrate consisting of glass PMMA, polycarbonate, or epoxy by spin coating or dipping to form a recording layer. In this case, the reversibility and the contrast can be improved by forming grooves in a recording direction in the substrate or by forming a thin metal film consisting of, e.g., Al or Ni-Cr, a thin alloy film, or a thin organic film consisting of, e.g., Al-naphthalocyanine as a reflecting layer on the recording layer. In addition, the reversibility and the durability can be improved by a structure (FIG. 1) in which the recording layer is sandwiched by Si, Ti, a coupling member, an organic metal chelating compound, or polyimide.

BRIEF DESCRIPTION OF THE DRAWINGS

FIGS. 1 to 7 are sectional views for explaining optical recording media according to Examples 1 to 7 of the present invention, respectively;

FIG. 8 is a sectional view for explaining a conventional optical recording medium;

FIG. 9 is a graph showing a relationship between a pulse width, an output, and a film temperature;

FIG. 10 is a graph showing a relationship between a wavelength and absorbency.

DETAILED DESCRIPTION OF THE PREFERRED EMBODIMENTS

Figure 11:
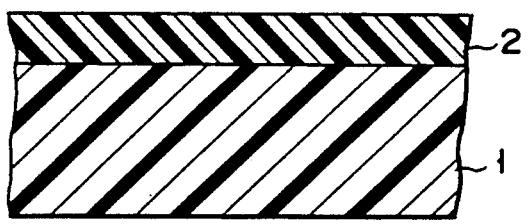
FIGS. 11 to 14 are sectional views for explaining optical recording media according to Examples 14 to 17 of the present invention.

The present invention will be described in detail below by way of its examples together with comparative examples.

Example 1

A polymer compound represented by formula ① in Table 3 was subjected to radical polymerization in DMF by using AIBN as an initiator, thereby obtaining a polymer liquid crystal represented by formula ② in Table 3.

| | |
|---|---|
| Polymer liquid crystal (Table 3, formula ②) | 100 parts by weight |
| Polymethine-based cyanine dye (formula ③ in Table 3) | 15 parts by weight |
| Solvent (1,2-dichloroethane) | 5,000 parts by weight |

The above materials were mixed and sufficiently, homogeneously dissolved to obtain a solution, and the solution was filtered and coated on an epoxy substrate 1 by spin coating, thereby forming a 0.2-μm thick recording layer 2. Subsequently, a 0.15-μm thick reflecting film 3 consisting of Al was stacked on the recording layer 2 by a deposition method, thereby obtaining an optical recording medium (FIG. 1).

This optical recording medium was held and initialized at 80° C. for 12 hours, and a semiconductor laser (wavelength = 830 nm) was focused into a diameter of about 1 μm and radiated with output power of 4 to 9 mW for 1 μsec. As a result, reflectivity was increased from 60% to 76%. When a semiconductor layer (wavelength = 830 nm) was focused into an ellipse having a major axis of 5 μm and a minor axis of 1 μm and radiated on the spot with output power of 1 to 5 mW for 5 μsec, the reflectivity was changed to 58% to enable erasure. Even after this cycle was repeated 1,000 times, no degradation was found in recording or erasure. The results are listed in Table 2 to be presented later.

Example 2

Polymethyl methacrylate was used as a starting material and bonded to formula ④ in Table 3 by an ester interchange reaction using p toluenesulfonic acid as a catalyst, thereby obtaining a target compound (represented by formula ⑤ in Table 3).

| | |
|---|---|
| Above compound (formula ④ in Table 3) | 100 parts by weight |
| Cyanine dye (formula ⑥ of Table 3) | 10 parts by weight |
| Solvent (methylethylketone) | 5,000 parts by weight |

The above materials were mixed and sufficiently, homogeneously dissolved, filtered, and coated on a glass substrate 5 having a 500-Å thick protective layer (undercoating layer) 4 consisting of polyimide by spin coating, thereby forming a 0.2-μm thick recording layer 2. Subsequently, a 0.07-μm thick Al-naphthophthalocyanine thin film 6 was formed on the recording layer 2 by a deposition method, and a 0.2 -μm thick reflecting film 3 consisting of Al was stacked thereon by a deposition method, thereby obtaining an optical recording medium (FIG. 2). The characteristics of this optical recording medium were measured following the same procedures as in Example 1. The obtained results are listed in Table 2 to be presented later.

Example 3

Poly(γ-benzyl)-L-glutamate (PBLG) was bonded to dodecylalcohol by an ester interchange reaction using p-toluenesulfonic acid as a catalyst, and polymerization conditions were adjusted to obtain a poly(γ-dodecyl-γ-benzyl)-L-glutamate copolymer (dodecyl composition=60%). Synthesis of PBLG was performed by an NCA method.

| | |
|---|---|
| Poly(γ-benzyl,γ-dodecyl)-L-glutamate (Mw = 43000) | 100 parts by weight |
| Anthraquinone dye (formula ⑦ in Table 3) | 20 parts by weight |
| Chloroform | 5,000 parts by weight |

Following the same procedures as in Example 1, the above materials were coated by spin coating on an acryl substrate 7 in which grooves were formed in a recording direction, thereby forming a 0.25-μm thick recording layer 2. Thereafter, Au was deposited on the recording layer 2 to have a thickness of 0.2 μm to form a reflecting film 3, thereby obtaining an optical recording medium (FIG. 3). The characteristics of this optical recording medium were measured following the same procedures as in Example 1. The obtained results are listed in Table 2 to be presented later.

Example 4

Poly(γ-methyl)-L-glutamate (PMLG) was used as a starting material and bonded to octyl alcohol by an ester interchange reaction using p-toluenesulfonic acid as a catalyst, thereby obtaining a poly(γ-octyl, γ-methyl)-L-glutamate copolymer (octyl composition=63%).

| | |
|---|---|
| Poly(γ-octyl,γ-methyl)-L-glutamate (Mw = 32,000) | 100 parts by weight |
| Anthraquinone dye (formula ⑧ in Table 3) | 10 parts by weight |
| Cyanine-based Dye (formula ⑨ in Table 3) | 10 parts by weight |
| Solvent (1,2-dichloroethane) | 5,000 parts by weight |

Following the same procedures as in Example 1, the above materials were coated on an epoxy substrate 1 by spin coating to form a 0.2 -μm thick recording layer 2. An Au-Pd alloy was deposited on the recording layer 2 to have a thickness of about 0.2 μm, thereby forming a reflecting film 3. A protective layer (polyethyleneterephthalate (PET) layer) 8 was stacked on the reflecting film 3 to obtain an optical recording medium (FIG. 4). The characteristics of this optical recording medium were measured following the same procedures as in Example 1. The obtained results are listed in Table 2 to be presented later.

Example 5

The polymer compounds (formulas ③ and ④ in Table 3) used in Examples 1 and 2 were used to form a composite matrix polymer.

| | |
|---|---|
| Polymer compound (formula ③ in Table 3) | 60 parts by weight |
| Polymer compound (formula 4 in Table 3) | 40 parts by weight |
| Polymethine-based cyanine dye (formula ⑩ in Table 3) | 10 parts by weight |
| Ni thiol complex (formula ⑪ in Table 3) | 1 part by weight |
| Solvent (1,2-dichloroethane) | 5,000 parts by weight |

That is, following the same procedures as in Example 1, the above materials were coated on an epoxy substrate 1 by spin coating to form a 0.2-μm thick recording layer 2. Al was deposited on the recording layer 2 to have a thickness of about 0.2 μm to form a reflecting film 3, thereby obtaining an optical recording medium (FIG. 5). The characteristics of this optical recording medium were measured following the same procedures as in Example 1. The obtained results are listed in Table 2.

Example 6

The polymer compound used in Example 1 was used to form a composite matrix polymer.

| | |
|---|---|
| Polymer compound (formula ② in Table 3) | 70 parts by weight |
| Polymer compound (formula ① in Table 3) | 10 parts by weight |
| Azo-based dye (formula ⑫ in Table 3) | 10 parts by weight |
| Cyanine-based dye (formula ⑬ in Table 3) | 10 parts by weight |
| Solvent (1,2-dichloroethane) | 5,000 parts by weight |

That is, following the same procedures as in Example 1, the above materials were coated on an acryl substrate 7 by spin coating to form a 0.2-μm thick recording layer 2. A protective layer (overcoating layer) 9 consisting of polyimide was formed on the recording layer 2 to have a thickness of about 0.05 μm, and a 0.25-μm thick Al reflecting film 3 was formed thereon, thereby obtaining an optical recording medium (FIG. 6). The characteristics of this optical recording medium were measured following the same procedures as in Example 1. The 10° C. for 30 minutes, and then cooled to a room temperature at −5° C., thereby obtaining an optical recording medium. Table 2 also shows the type of a solvent, the presence/absence of a dye, the concentration of a dye with respect to a liquid crystal polymer, the presence/absence of a reflecting film, and the material of a transparent substrate:

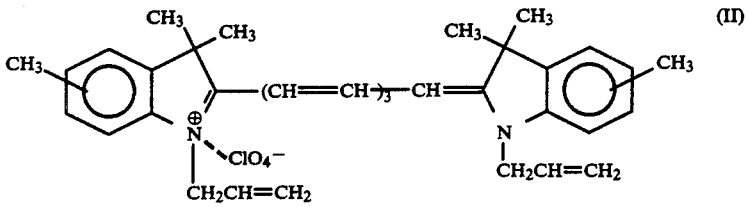

obtained results are listed in Table 2.

Example 7 The polymer compound (formula ④ in Table 3) used in Example 2 and modified polymethyl methacrylate (PMMA, styrene-modified) were used to form a composite polymer material.

| | |
|---|---|
| Polymer compound (formula ④ in Table 3) | 85 parts by weight |
| Styrene-modified PMMA | 15 parts by weight |
| Polymethine-based cyanine dye (formula ⑭ in Table 3) | 10 parts by weight |
| Solvent (MEK) | 5,000 parts by weight |

That is, following the same procedures as in Example 1, the above materials were coated on an acryl substrate, 7 by spin coating to form a 0.2-μm thick recording layer 2. A Ni-Cr alloy was sputtered on the recording layer 2 to have a thickness of about 0.3 μm to form a reflecting film 3, thereby obtaining an optical recording medium (FIG. 7). The characteristics of this optical recording medium were measured following the same procedures as in Example 1. The obtained results are listed in Table 2 to be presented later.

Comparative Example 1

| | |
|---|---|
| Polymer liquid crystal; poly(γ-methyl,γ-hexyl)-L-glutamate (hexyl composition = 64%) Mw = 28000 | 100 parts by weight |
| Azo-based dye (formula ⑮ in Table 3) | 10 parts by weight |

Following the same procedures as in Example 1, the above materials were coated on a glass substrate to form a recording layer 2, and an Al reflecting film 3 was formed thereon, thereby obtaining an optical recording medium (FIG. 8). The characteristics of this optical recording medium were measured following the same procedures as in Example 1.

Example 8

A liquid crystal polymer represented by formula ① in Table 4 and a cyanine-based dye represented by following formula (II) were dissolved in solvents at concentrations as listed in Table 4 and then mixed. The resultant solvent mixture was coated on a grooved epoxy substrate by spin coating to form a film. In order to adjust an initial state of a medium, the resultant structure was heated at a temperature higher than a liquid phase transition of each liquid crystal polymer by about A 4-mW beam of a semiconductor laser having an oscillation wavelength of 0.83 μm was focused into a circular spot having a diameter of 1 μm by an optical lens and pulse radiated on the optical recording medium obtained as described above from the transparent substrate side for 1 μsec, thereby performing recording. The reflectivities at a non-recorded portion and a recorded portion are as shown in Table 5 on the attached sheet. An elliptic spot of a 3 mW laser beam was radiated on the recorded portion for 4 μsec to perform erasure. The reflectivity obtained after erasure is as shown in Table 5.

Examples 9-13

Liquid crystal polymers and solvents listed in Table 5 on the attached sheet to be presented later were used to obtain optical recording media following the same procedures as in Example 8. The type of a solvent, the presence/absence of a dye, the concentration of a dye with respect to a liquid crystal polymer, the presence/absence of a reflecting film, and the material of a transparent substrate are as listed in Table 5. A cyanine-base dye is used in Examples 9 to 13 as in Example 8. The dye is not limited to the cyanine-based dye but may be those described in the attached sheet to be presented later.

Comparative Example 2

A polymer liquid crystal represented by formula ⑭ shown in Table 4 on the attached sheet was dissolved in chloroform to prepare a 1 wt % solution. The resultant solution was spin-coated on an acryl substrate to form a 0.25μm thick recording layer. An Al reflecting film was formed on the recording layer to obtain an optical recording medium. When recording and erasure were performed on this optical recording medium following the same procedures as in Example 8, neither recording nor erasure could be performed.

Comparative Example 3

Polymer liquid crystals represented by formulas ⑤ and ⑮ in Table 4 on the attached sheet were dissolved in 1,2-dichloroethane to prepare 1.5-wt % solutions, respectively, and then mixed. The resultant solution mixture was spin-coated on an acryl substrate to form a 0.25-μm thick recording layer. A 800-Å thick Al naphthophthalocyanine reflecting film was formed on the recording layer to obtain an optical recording medium. When recording and erasure were performed on this optical recording medium following the same procedures as in Example 8, neither recording nor erasure could be performed.

Example 14

Example 14 will be described below with reference to FIG. 11.

A compound represented by the following formula was added to poly -benzyl-L-glutamic acid in an ester equivalent amount 10 times that of the acid, and p-toluenesulfonic acid was added thereto as a catalyst, thereby performing an ester interchange reaction in 1,2-dichloroethane to obtain a polymer represented by formula (1) in Table 6 on the attached sheet to be presented later:

300 parts by weight of the above liquid crystal polymer, 40 parts by weight of a dye represented by formula (7) in Table 7 on the attached sheet, and 10,000 parts by weight of chloroform as a solvent were mixed and sufficiently, homogeneously dissolved. The resultant solution was spin-coated on a glass substrate 1 subjected to a hydrophobic treatment to form a 0.3-μm thick thin film (recording layer) 2, thereby obtaining an optical recording medium This optical recording medium was annealed at 120° C. for 30 minutes, and a semiconductor laser (wavelength=830 nm) focused into a diameter of about 1.0 μm was radiated at output power of 2 to 7 mW on the medium to perform recording. As a result, the reflectivity changed as shown in Table 7 on the attached sheet to be presented later. When a semiconductor laser elliptic spot having a major axis of 5 μm and a minor axis of 1 μm was radiated to perform erasure, the reflectivity at a recorded portion could be recovered to be that obtained before recording. Even after this cycle was repeated 1,000 times, almost no degradation was found in both recording and erasure.

Example 15

Figure 12:
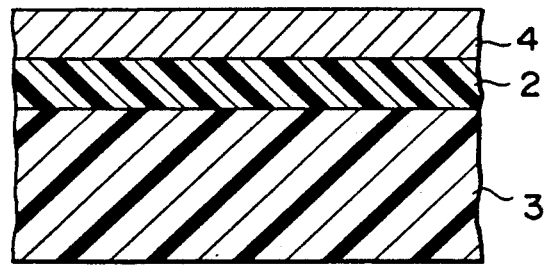

Example 15 will be described below with reference to FIG. 12.

The following compound was added to 10 g of polyγ-benzyl-L-glutamic acid in an ester equivalent amount 10 times that of the acid and p-toluenesulfonic acid was added thereto as a catalyst, thereby performing an ester interchange reaction in 1,2 dichloroethane. Thereafter, dodecyl alcohol was bonded to obtain a liquid crystal polymer represented by formula (2) in Table 6 on the attached sheet to be presented later:

300 parts by weight of the above liquid crystal polymer, 30 parts by weight of a first dye represented by formula (8) in Table 7 on the attached sheet, 20 parts by weight of a μsecond dye represented by formula (9) in Table 7, and 10,000 parts by weight of chloroform as a solvent were mixed and sufficiently, homogeneously dissolved. The resultant solution was coated on an epoxy substrate 3 by spin coating to form a 0.3-μm thick thin film (recording layer) 2, and an Au reflecting film 4 was formed thereon, thereby obtaining an optical recording medium.

The characteristics of this optical recording medium were measured following the same procedures as in Example 14. The obtained results are summarized in Table 8.

Example 16

Figure 13:
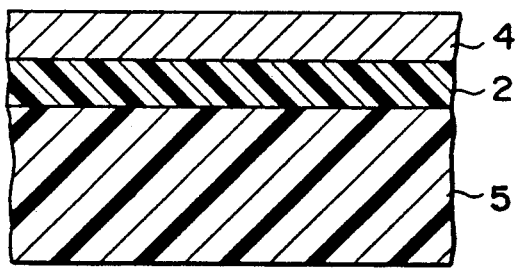

Example 16 will be described below with reference to FIG. 13

100 parts by weight of a liquid crystal polymer represented by formula (3) in Table 6 on the attached sheet to be presented later, 10 parts by weight of a light-absorbing dye represented by formula (10) in Table 7 on the attached sheet, 5 parts by weight of a two-tone dye represented by formula (11) in Table 7, and 5,000 parts by weight of 1,2-dichloroethane/chloroform were mixed and sufficiently, homogeneously dissolved. The resultant solution was spin-coated on an epoxy substrate 5 having 2.0-μm wide, 1,000-Å deep grooves in a recording direction to form a 0.2-μm thick thin film (recording layer) 2, and an Au reflecting film 4 was formed thereon, thereby obtaining an optical recording medium.

The characteristics of this optical recording medium were measured following the same procedures as in Example 14. The obtained results are summarized in Table 8.

Example 17

Figure 14:
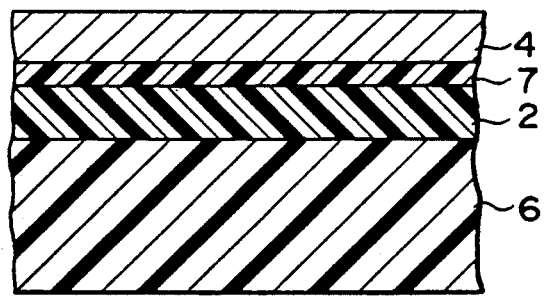

Example 17 will be described below with reference to FIG. 14.

300 parts by weight of a liquid crystal polymer represented by formula (4) in Table 6 on the attached sheet to be presented later, 40 parts by weight of a light-absorbing dye represented by formula (12) in Table 7 on the attached sheet to be presented later, and 10,000 parts by weight of chloroform as a catalyst were spin-coated on an acryl substrate 6 following the same procedures as in Example 14, thereby forming a 0.2-μm thick thin film (recording layer) 2. Polyamide was stacked on the recording layer 2 by a deposition/polymerization method to have a thickness of 800 Å to form a protective layer 7, and an Al reflecting film 4 was formed, thereby obtaining an optical recording medium.

The characteristics of this optical recording medium were measured following the same procedures as in Example 14. The obtained results are summarized in Table 8.

Comparative Example 4

A liquid crystal polymer represented by formula (5) in Table 7 on the attached sheet to be presented later was obtained by a radical polymerization method using AIBN as an initiator. 100 parts by weight of the liquid crystal polymer, 10 parts by weight of a dye represented by formula (12) in Table 7 on the attached sheet to be presented later, and 5,000 parts by weight of methylethylketone were coated on a glass substrate by spin coating following the same procedures as in Example 14, thereby obtaining a 0.2-μm thick recording layer. Subsequently, Al was deposited on this recording layer to form a 0.2-μm thick reflecting film, thereby obtaining an optical recording medium.

The characteristics of this optical recording medium were measured following the same procedures as in Example 14. As a result, a C/N ratio and an erasing ratio were apparently increased.

Comparative Example 5

First, n-octanol was added to poly-γ-benzyl-L-glutamic acid to perform an ester interchange reaction using p-toluenesulfonic acid as a catalyst, thereby obtaining a liquid crystal polymer represented by formula (6) in Table 6 on the attached sheet to be presented later. 300 parts by weight of this liquid crystal polymer, 30 parts by weight of a dye represented by formula (14) in Table 7 on the attached sheet to be presented later, and 10,000 parts by weight of 1,2-dichloroethane were coated on a glass substrate by spin coating following the same procedures as in Example 14, thereby forming a 0.2-μm thick recording layer. Subsequently, Al was deposited on the recording layer to form a 0.5-μm thick reflecting film, thereby obtaining an optical recording medium.

Example 18

50 parts by weight of a branched high polymer liquid crystal (formula ① shown in Table 9) was polymerized by using azo-bisisobutylonitril as an initiator in benzene. The resultant compound and 5 parts by weight of a branched high polymer liquid crystal (formula ② shown in Table 9) were mixed with 100 parts by weight of chloroform to obtain a homogeneous solution. After being filtered, the solution was spin-coated on a glass substrate to form 0.25 μm thick recording layer. Thereafter, a reflection film having a thickness of 0.1 μm was laminated on the recording layer by vapor-depositing for example Al thereby to obtain an optical recording medium.

This optical recording medium was heated at a temperature of 120° C. for 30 minutes, and, after being initialized, was subjected to an irradiation of a semiconductor laser (wave-length 830 nm) converged to about 1 μm in diameter with an output of 4 to 9 mW for 1 μsec.. As a result, it was found that the reflectance was increased to 55% from 40%. When a semiconductor laser (wave-length 830 nm) converged to an elliptical shape 5 μm in long axis and 1 μm in short axis was irradiated to the same spot which hand been irradiated with the semiconductor laser as mentioned above with an output of 1 to 5 mW for 5 μsec., the reflectance was changed to 41%, thus indicating the erasability of the recording medium. Even if this cycle of irradiating with the semiconductor laser was repeated 1000 times, any deterioration of recording or erasing property of the recording medium was not recognized. These results are shown in Table 11.

Example 19

75 parts by weight of a branched high polymer liquid crystal (formula ③ shown in Table 9) and 10 parts by weight of dyestuff (formula ⑪ shown in Table 10) were mixed with 900 parts by weight of chloroform and 100 parts by weight of toluene to obtain a homogeneous solution. Then, after being filtered, this solution was spin-coated on a glass substrate, thereby forming a recording layer 0.4 μm in thickness. Thereafter, a reflection film having a thickness of 0.1 μm was laminated on the recording layer by vapor depositing for example Al thereby to obtain an optical recording medium.

Example 20

50 parts by weight of a branched high polymer liquid crystal (formula ③ shown in Table 9) was polymerized in the same manner as in Example 18. The resultant compounds and 7.5 parts by weight of a dyestuff (formula ⑩ shown in Table 10) were mixed with 800 parts by weight of chloroform and 200 parts by weight of 1,2-dichloroethane to obtain a homogeneous solution. Then, after being filtered, this solution was spin-coated on a epoxy substrate, thereby forming a recording layer 0.35 μm in thickness. Thereafter, a reflection film having a thickness of 0.1 μm was laminated on the recording layer 0.35 μm was laminated on the recording layer by vapor-depositing for example Al thereby to obtain an optical recording medium.

When this recording medium was subjected to measurements under the same conditions as in Example 18, results shown in Table 11 were obtained.

Example 21

100 parts by weight of a branched high polymer liquid crystal (formula ④ shown in Table 9) was polymerized in the same manner as in Example 18. The resultant compounds and 15 parts by weight of a dyestuff (formula ⑩ shown in Table 10) were mixed with 1000 parts by weight of chloroform to obtain a homogeneous solution. Then, after being filtered, this solution was spin-coated on a glass substrate thereby to obtain a recording layer 0.4 μm in thickness. Then, a reflection film having thickness of 0.1 μm was laminated on the recording layer by vapor-depositing for example Al thereby to obtain an optical recording medium.

When this recording medium was subjected to measurements under the same conditions as in Example 18, results shown in Table 11 were obtained.

Example 22

75 parts by weight of a branched high polymer liquid crystal (formula ⑥ shown in Table 9) was polymerized in the same manner as in Example 18. The resultant compounds and 7.5 parts by weight of a dyestuff (formula ⑪ shown in Table 10) were mixed with 950 parts by weight of chloroform and 50 parts by weight of toluene to obtain a homogeneous solution. Then, this solution was filtered. On the other hand, a reflection film 0.1 μm in thickness was formed on an epoxy substrate by vapor-depositing for example Al. Then, an under-coat layer mainly consisting of Si-coupling agent and having a thickness of 0.2 μ was laminated thereon by a spin-coating method. Further, above solution was spin-coated on the under-coat layer to form a recording layer 0.35 μm in thickness, thereby to obtain an optical recording medium.

When this recording medium was subjected to measurements under the same conditions as in Example 18, results shown in Table 11 were obtained.

Comparative Example 6

100 parts by weight of a branched high polymer liquid crystal (formula ⑧ shown in Table 9) was polymerized in the same manner as in Example 18. The resultant compounds and 10 parts by weight of a dyestuff (formula ⑬ shown in Table 10) were mixed with 1000 parts by weight of chloroform to obtain a homogeneous solution. Then, after being filtered, this solution was spin-coated on a glass substrate thereby to obtain a recording layer 0.3 μm in thickness. Then, a reflection film having a thickness of 0.1 μm was laminated on the recording layer by vapor depositing for example Al thereby to obtain an optical recording medium.

When this recording medium was subjected to measurements under the same conditions as in Example 18, results shown in Table 11 were obtained.

Comparative Example 7

75 parts by weight of a branched high polymer liquid crystal (formula ⑨ shown in Table 9) was polymerized in the same manner as in Example 18. The resultant compounds and 7.5 parts by weight of a dyestuff (formula ⑭ shown in Table 10) were mixed with 1000 parts by weight of chloroform to obtain a homogeneous solution. Then, after being filtered, this solution was spin-coated on a glass substrate thereby to obtain a recording layer 0.3 μm in thickness. Then, a reflection film having a thickness of 0.1 μm was laminated on the recording layer by vapor-depositing for example Al thereby to obtain an optical recording medium.

When this recording medium was subjected to measurements under the same conditions as in Example 18, results shown in Table 11 were obtained.

Example 23

A polyglutamate derivative (formula ① in Table 12 to be presented later), a monomer liquid crystal (formula ⑪ in Table 13 to be presented later), and a dye (formula ㉑ in Table 14 to be presented later) were dissolved in chloroform at a weight ratio of 250:25:5:10,000, and spin-coated on a grooved disk substrate to form a 0.4-μm thick recording layer. The grooved disk substrate was made of polycarbonate and had a 0.01-μm thick SiO deposition film as an undercoating. SiO was deposited as an overcoating on the recording layer to have a thickness of about 0.01 μm, and a 0.3-μm thick Al layer (reflecting layer) was deposited and stacked thereon. The resultant structure was held at a temperature of 100° C. for one hour and annealed to obtain an optical recording medium.

A laser having an oscillation wavelength of 830 μm was focused into a diameter of 1 μm by an optical lens and radiated on the optical recording medium from the substrate side at laser power of 5 mW for 1 μsec, thereby forming a recorded portion. Laser light focused into a diameter of about 5 μm by an optical lens was radiated on the recorded portion at laser power of about 3 mW for about 5 μsec, thereby forming an erased portion. A signal at the recorded portion was at −54 dB, while that at the erased portion was at −16 dB. After the above recording/erasure cycle was repeated 1,000 times, the signal at the recorded portion was at −51 dB, while that at the erased portion was at −17 dB.

Example 24

A polyglutamate derivative (formula 2 in Table 12 to be presented later), a monomer liquid crystal (formula 12 in Table 13 to be presented later), and a dye (formula 22 in Table 14 to be presented later) were dissolved in chloroform and toluene at a weight ratio of 250:25:37.5:9,000:1,000. The resultant solution was spin-coated on a grooved disk substrate to form a recording layer having a film thickness of about 0.45 μm. Note that a substrate, an undercoating layer, an overcoating layer, a reflecting film, and the type and conditions of annealing were the same as in Example 23.

Following the same procedures as in Example 23, recording and erasure were performed on this optical recording medium to measure its erasing characteristics. After a recording/erasure cycle was performed once, a signal at a recorded portion was at −56 dB, while that at an erased portion was at −17 dB. After this recording/erasure cycle was repeated 1,000 times, the signal at the recorded portion was at −53 dB, while that at the erased portion was at −18 dB.

Example 25

A polyglutamate derivative (formula 3 in Table 12 to be presented later), a monomer liquid crystal (formula 13 in Table 13 to be presented later), a dye (formula 23 in Table 14 to be presented later), and a dye (formula 26 in Table 14 to be presented later) were dissolved in chloroform and toluene at a weight ratio of 250:25:25:25:9,000:1,000. The resultant solution was spin-coated on a grooved disk substrate to form a recording layer having a film thickness of about 0.45 μm. Note that the grooved disk substrate was made of an epoxy resin, and an undercoating layer, an overcoating layer, a reflecting film, and the type and conditions of annealing were the same as in Example 23.

Following the same procedures as in Example 23, recording and erasure were performed on this optical recording medium to measure its erasing characteristics. After a recording/erasure cycle was performed once, a signal at a recorded portion was at −57 dB, while that at an erased portion was at −19 dB. After this recording/erasure cycle was repeated 1,000 times, the signal at the recorded portion was at −56 dB, while that at the erased portion was at −19 dB.

Examples 26–32

Materials and the like of members used in Examples 26 to 32 will be listed in Table ④ to be presented layer together with those in Examples 23 to 25 and Comparative Examples 8 to 10.

Comparative Example 8

A polyglutamate derivative (formula 1 in Table 12 to be presented later) and a dye (formula 21 in Table 14 to be presented later) were dissolved in chloroform at a weight ratio of 250:37.5:10,000. The resultant solution was spin-coated on a grooved disk substrate to form a recording layer having a film thickness of about 0.4 μm. Note that the grooved disk substrate was made of an epoxy resin and an undercoating layer, an overcoating layer, a reflecting film, and the type and conditions of annealing were the same as in Example 23.

Following the same procedures as in Example 23, recording and erasure were performed on this optical recording medium to measure its erasing characteristics. After a recording/erasure cycle was performed once, a signal at a recorded portion was at −48 dB, while that at an erased portion was at −20 dB. After this recording/erasure cycle was repeated 1,000 times, the signal at the recorded portion was at −47 dB, while that at the erased portion was at −22 dB.

Comparative Examples 9 & 10

Comparative Examples 9 and 10 are listed in Table 5 together with Comparative Example 8.

Example 33

| | |
|---|---|
| Liquid crystal polymer (formula 1 in Table 16) | 30 parts by weight |
| Monomer liquid crystal | 3 parts by weight |

| | |
|---|---|
| (formula 6 in Table 17) | |
| Light-absorbing dye | 3 parts by weight |
| (formula 11 in Table 17) | |
| Chloroform (solvent) | 1,000 parts by weight |

The above materials were sufficiently, homogeneously mixed to obtain a solution, and the resultant solution was spin-coated on a grooved epoxy substrate (support) having a 200-Å thick SiO deposition film on its (recording layer). A 200-Å thick SiO layer (overcoating layer) and a 5,000-Å thick Al layer (reflecting layer) were formed on the above thin film to form an optical recording medium.

An LD laser having an oscillation wavelength of 830 nm was focused into a diameter of 1 μ and radiated on the optical recording medium at an intensity of 4 mW and a frequency of 1 MHz. As a result, reflectivity was changed from 41% to 59%, and a C/N ratio was 45 dB.

When a laser was focused into an ellipse having a major axis of 5 μm and a minor axis of 1 μm and continuously radiated on this recording medium at an intensity of 2.5 mW, the reflectivity was reduced to be 40% to recover the original signal level. At this time, an erasing ratio was −21 dB. After this recording/erasure cycle was repeated 1,000 times, no degradation was found. The obtained results are summarized in Table 19.

Examples 34–37 & Comparative Examples 11 & 12

Materials used as liquid crystal polymers, monomer liquid crystals, light-absorbing dyes, solvents, substrates, undercoating layers, protective layers, reflective layers, and the like, and recording characteristics thereof are summarized in Table 19.

(1) Cyanine-based dyestuff $$\left[ Z \underset{Y}{\overset{\psi-L-\psi}{\bigcirc \bigcirc}} Z \right]^+ X^\ominus$$

wherein ψ, L, X, Y and Z are as follows:

① ψ ...
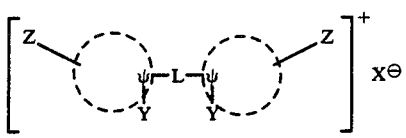

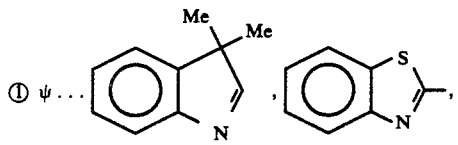

② L ... $-(CH=CH)_n-CH=$ (wherein n is an integer of 1 to 3),

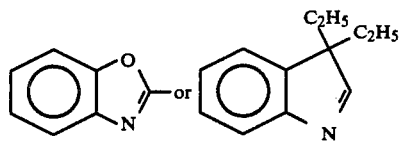
—CH=CH— =CH—CH (wherein A is Cl, F or Br),

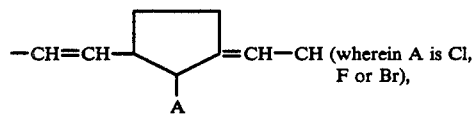
—CH=CH— =CH—CH (wherein A is Cl, F or Br) or

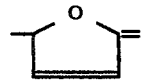

3  X ... $I^\ominus$, $ClO_4^\ominus$, $BSF^\ominus$, $Br^\ominus$ or $BF_4^\ominus$;

4  Y ... $C_nH_{2n+1}$ (n = 1~18), $C_nH_{2n}OC_mH_{2m+1}$ (n, m = 1~18), $(CH_2)_nR$ (n = 0~18),

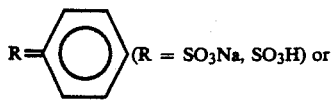 (R = SO$_3$Na, SO$_3$H) or
C$_n$H$_{2n-1}$C$_m$H$_{2m}$ (n, m = 1~18);
5  Z ... —X (halogen), —R (alkyl),
—ROH, —RCOH, —RCOOH, —ROR',
—RCOR', —RCOOR', ,
—CH=CH—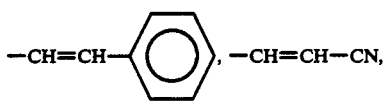, —CH=CH—CN,
—OCF$_3$ or —OSF$_3$
(2) merocyanine-based dyestuff
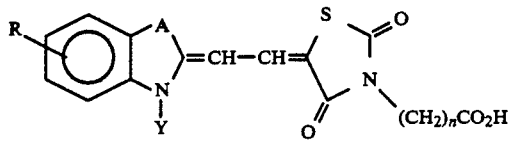
wherein, R = H, CH$_3$, X (halogen) or
OC$_m$H$_{2m+1}$ (m = 1~3);
A = S, Se;
n = 1~6
(3) Ni-thiol complex-based dyestuff
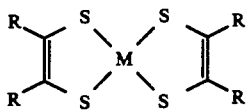
(M = Ni, R = C$_3$H$_7$)
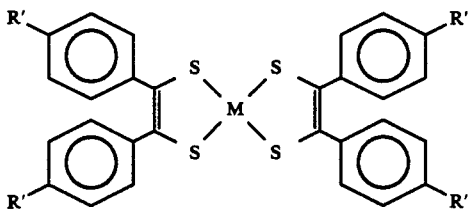
$\begin{pmatrix} M = Ni, Pt \\ R' = H, OCH_3 \end{pmatrix}$
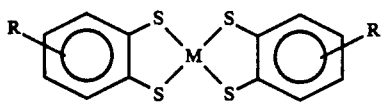
wherein, R = H, Cl or Br; M = Ni or Pt -continued
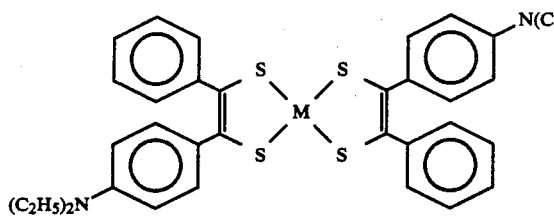
(4) Naphtho/phthalocyanine-based dyestuff
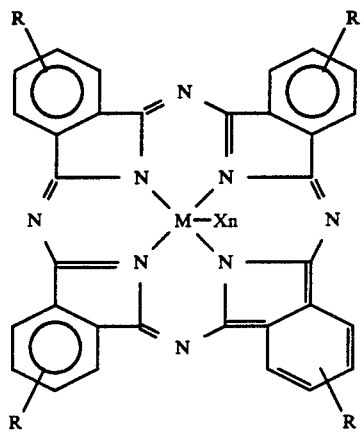
wherein, R = H, C(CH₃)₃ or ⌬;
M = V, H, Pb, Ti, H, Al, Ti or Sm;
X = H, —O—, Cl, F or OH
(5) Pyrylium-, thiopyrilium-based dyestuff
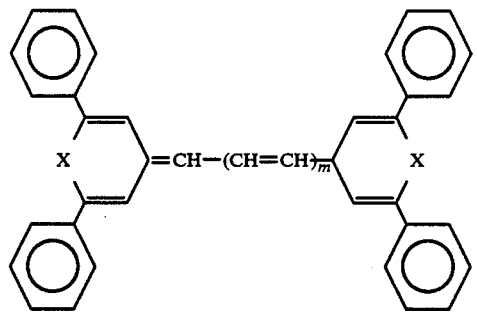
wherein n = 1 or 2;
X = S, O or N—C₂H₅;
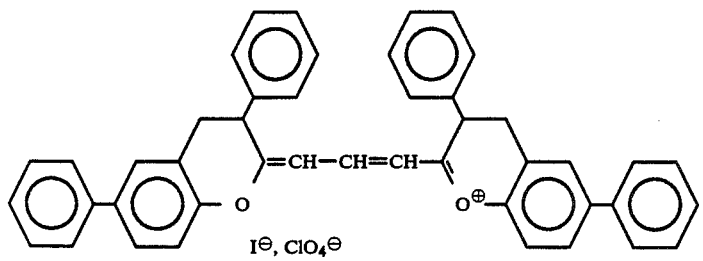
(6) Naphthoquinone-based dyestuff

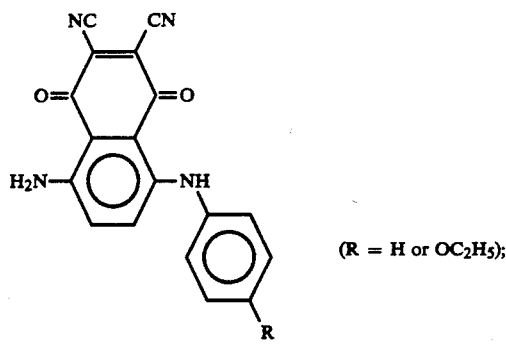
(R = H or OC$_2$H$_5$);
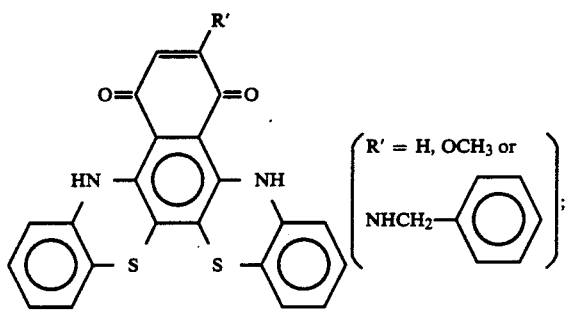
$\begin{pmatrix} R' = H, OCH_3 \text{ or} \\ NHCH_2-\phantom{xx} \end{pmatrix}$;
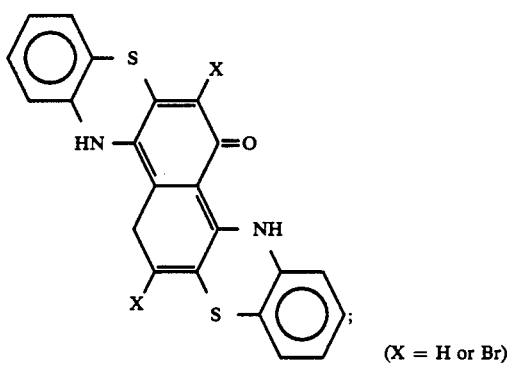
(X = H or Br)
(7) Anthraquinone-based dyestuff
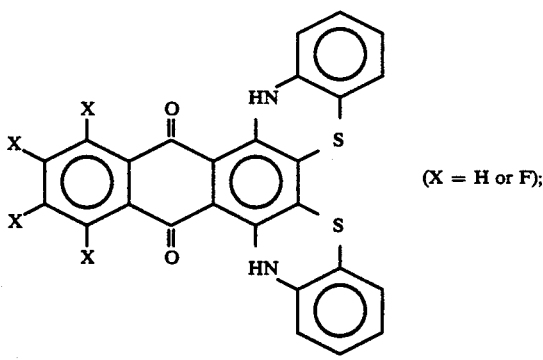
(X = H or F);
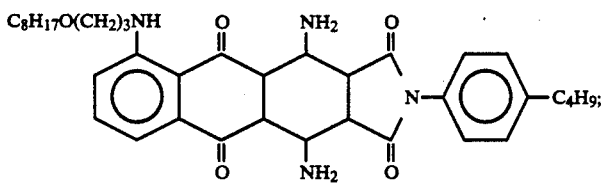

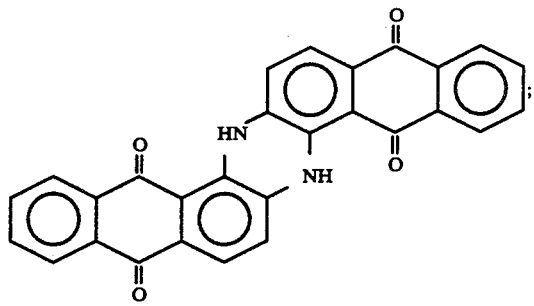
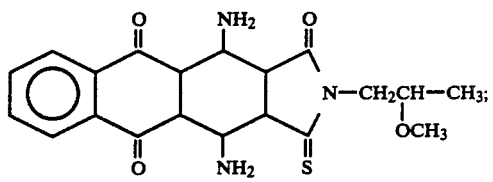
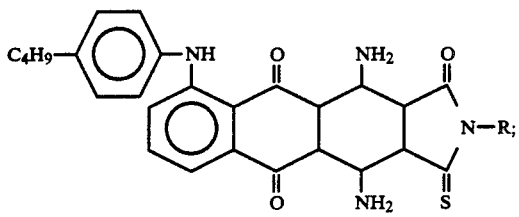
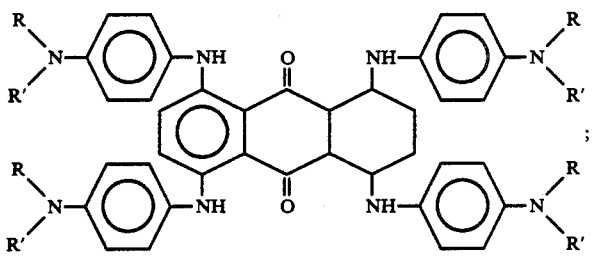
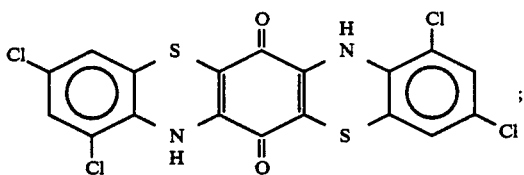
(wherein R is an alkyl group, aryl group or arylalkyl group having 1–18 carbon atoms)
(9) Arylazo-based dyestuff
X—N=N—Y—N=N—Z
wherein,
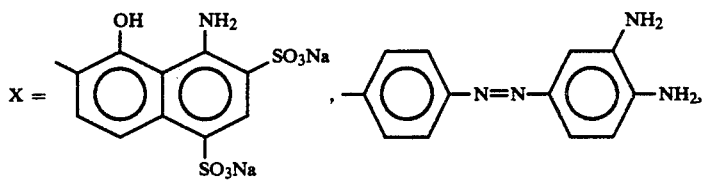
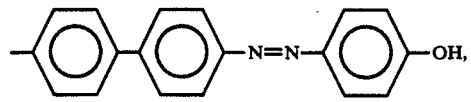

-continued
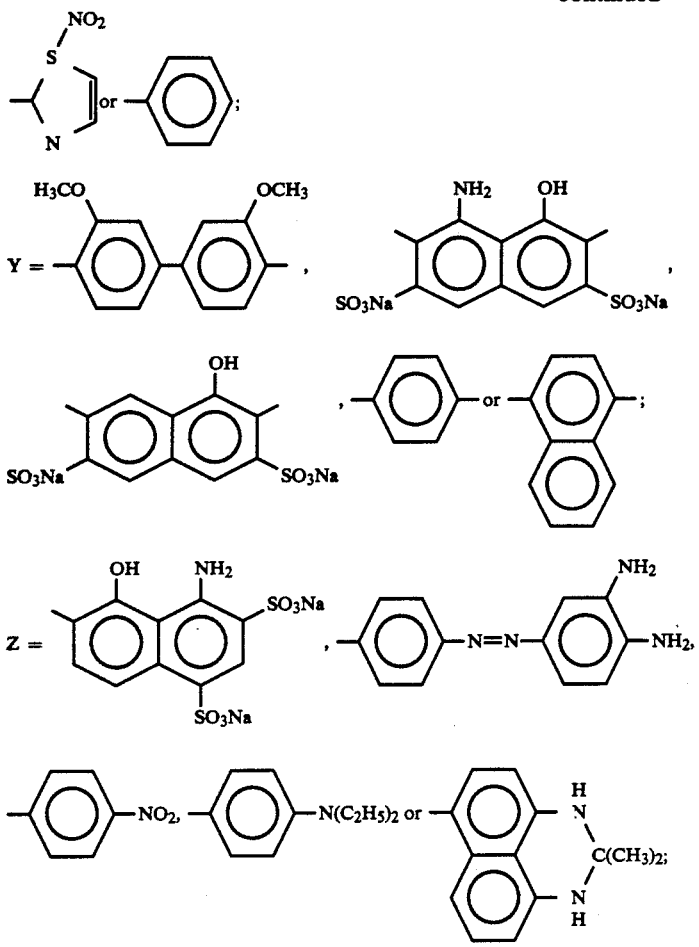
| TABLE 2 | | | | | | | | |
|---|---|---|---|---|---|---|---|---|
| | Ex. 1 | Ex. 2 | Ex. 3 | Ex. 4 | Ex. 5 | Ex. 6 | Ex. 7 | Comp. Ex. 1 |
| Reflectance | | | | | | | | |
| Before recording | 60 | 54 | 67 | 56 | 57 | 59 | 57 | 84 |
| After recording | 76 | 70 | 82 | 67 | 71 | 75 | 69 | 83 |
| After erasion | 61 | 54 | 66 | 56 | 57 | 58 | 57 | 84 |
| After 1000 times | | | | | | | | |
| TABLE 2-continued | | | | | | | | |
|---|---|---|---|---|---|---|---|---|
| | Ex. 1 | Ex. 2 | Ex. 3 | Ex. 4 | Ex. 5 | Ex. 6 | Ex. 7 | Comp. Ex. 1 |
| Before recording | 58 | 56 | 65 | 58 | 59 | 60 | 60 | 86 |
| After recording | 77 | 68 | 81 | 65 | 70 | 77 | 68 | 86 |
| After erasion | 58 | 57 | 67 | 57 | 59 | 59 | 59 | 86 |
| Overwrite property | Yes | Yes | Yes | Yes | Yes | Yes | Yes | No |
TABLE 3
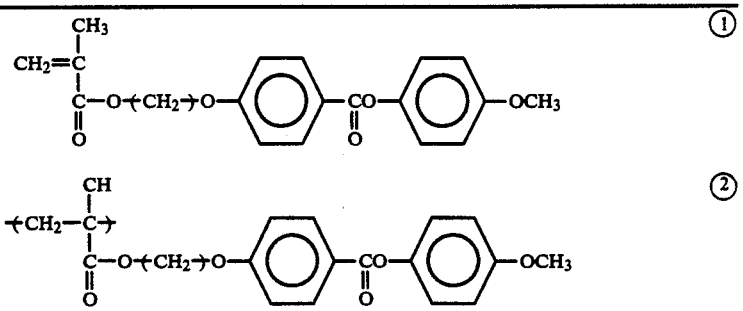

TABLE 3-continued
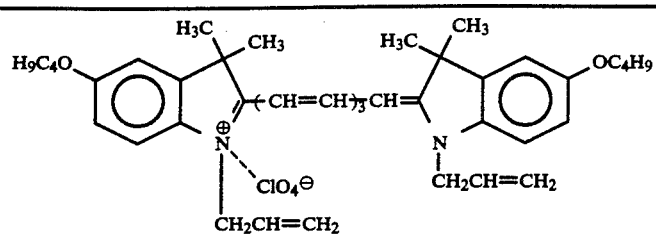 ③
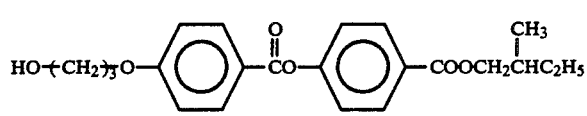 ④
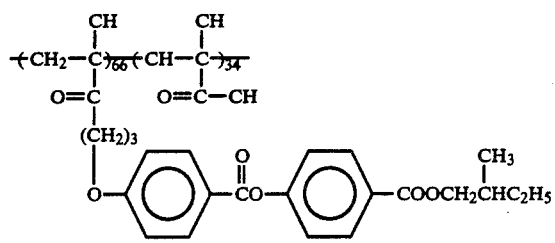 ⑤
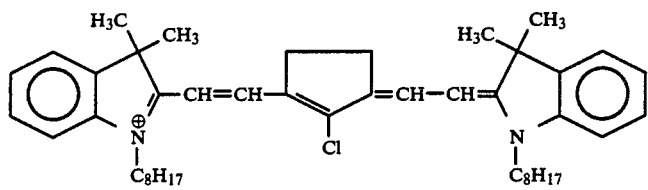 ⑥
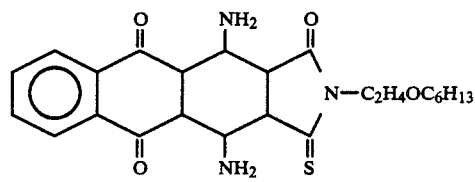 ⑦
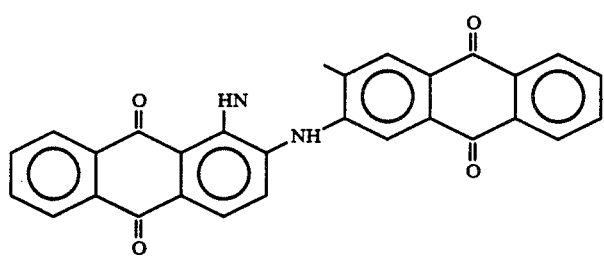 ⑧
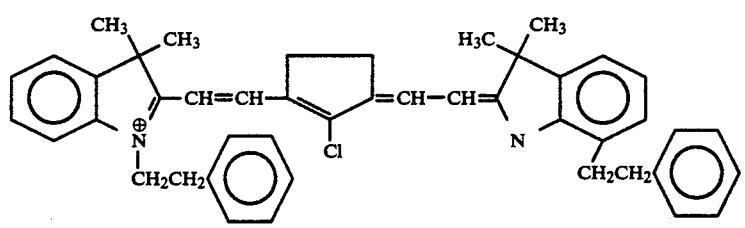 ⑨
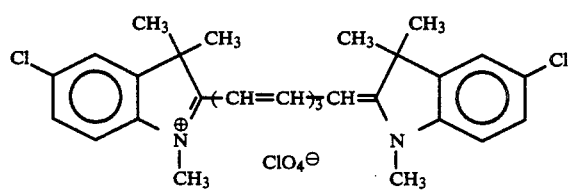 ⑩

TABLE 3-continued
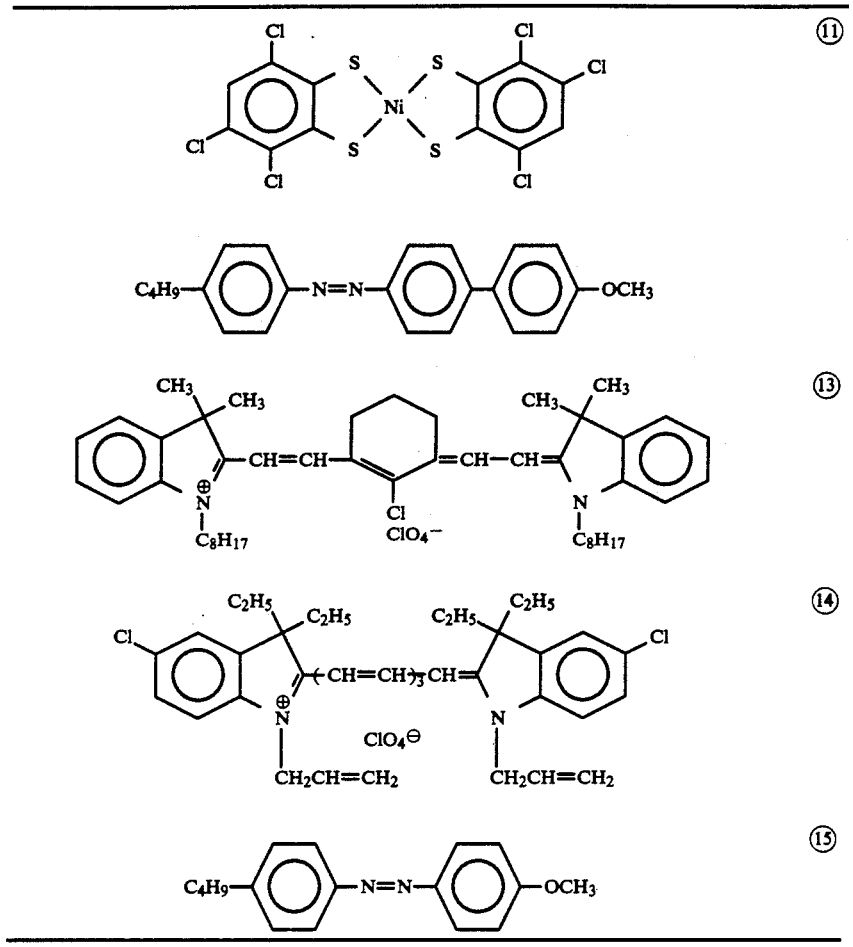
TABLE 4
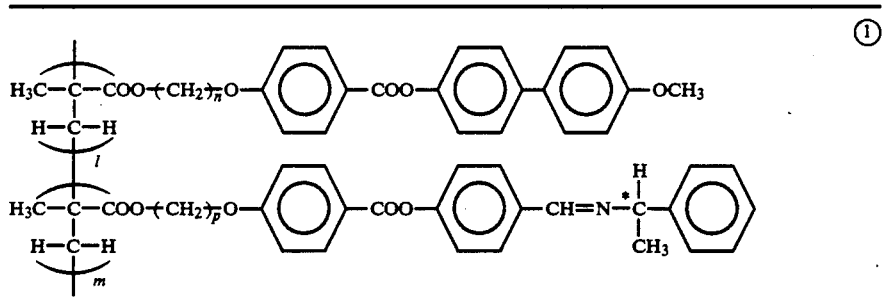
wherein,
$50 \leq l + m \leq 1000$, $l/m = 0/100 \sim 40/60$,
$n = 3 \sim 10$ and $p = 1 \sim 5$
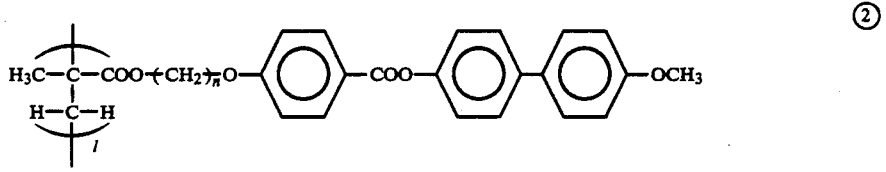

TABLE 4-continued
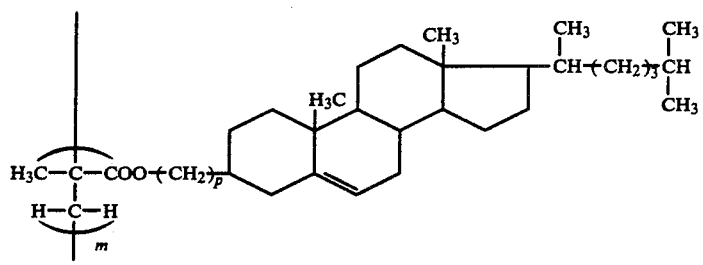
wherein,
$50 \leq 1 + m \leq 1000$, $1/m = 0/100 \sim 30/70$,
$n = 1 \sim 5$ and $p = 7 \sim 20$
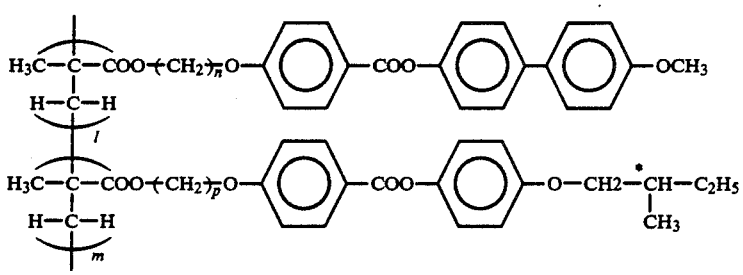
(3)
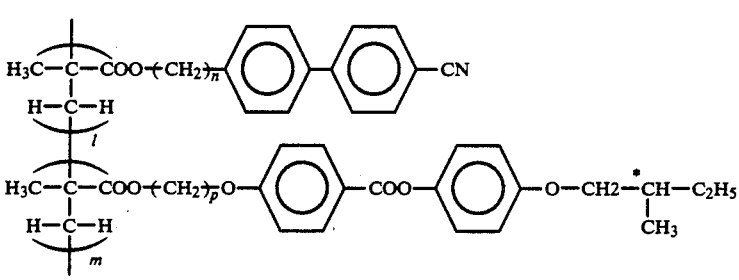
(4)
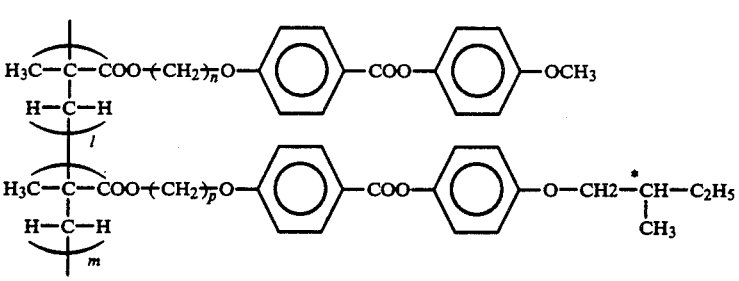
(5)
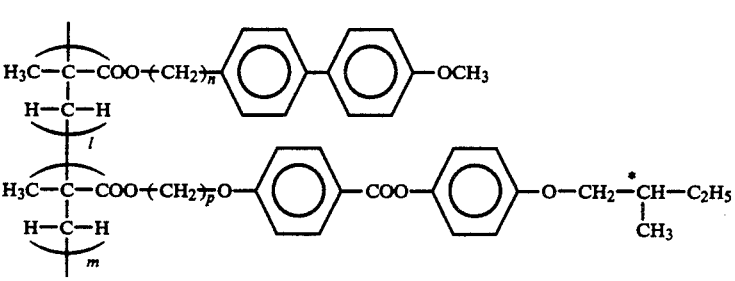
(6)
in the formula ③ to ⑥,
$50 \leq 1 + m \leq 1000$, $1/m = 0/100 \sim 50/50$,
$n = 1 \sim 10$, $p = 1 \sim 10$ TABLE 4-continued
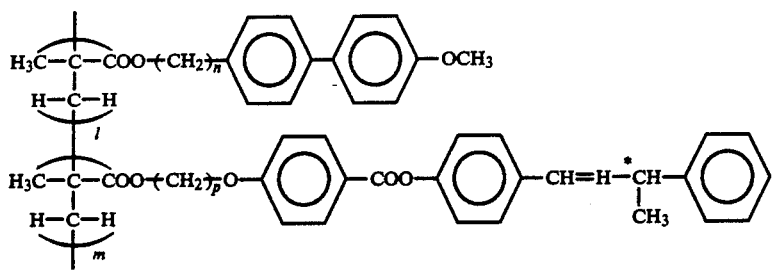   ⑦
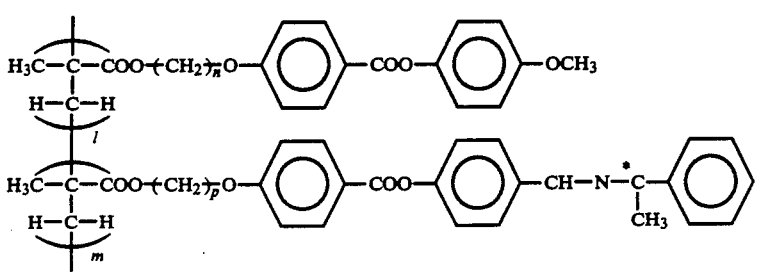   ⑧
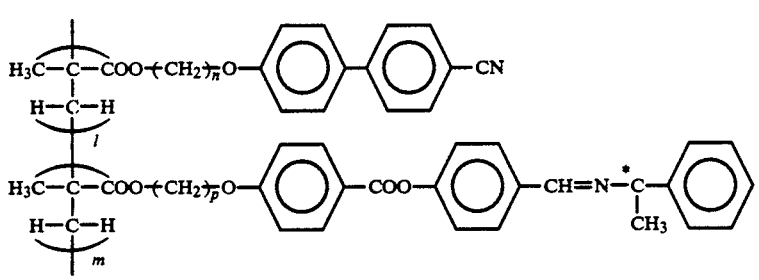   ⑨
in the formula ⑦ to ⑨,
$50 \leq l + m \leq 1000$, $l/m = 0/100 \sim 50/50$,
$n = 1 \sim 10$, $p = 1 \sim 10$
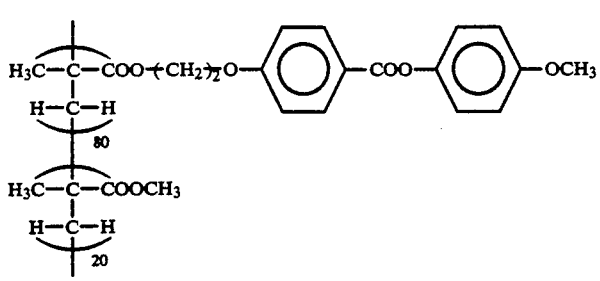   ⑩
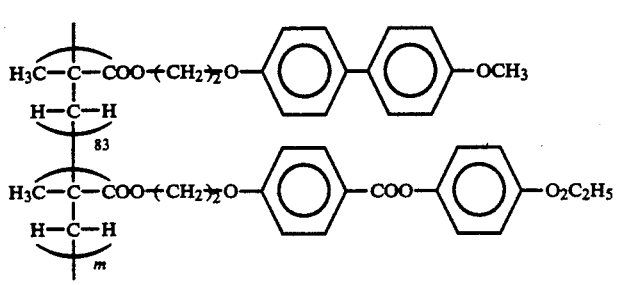   ⑪

TABLE 4-continued

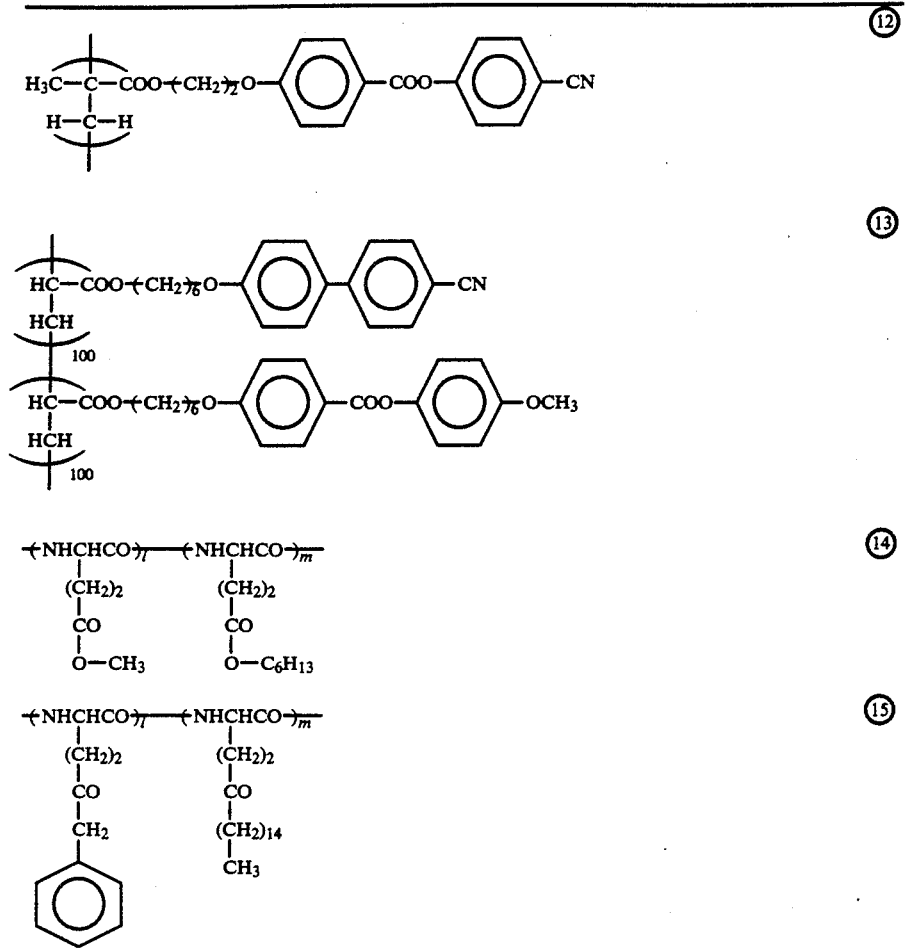

TABLE 5

|  | Ex. 8 Formula ① | Ex. 9 Formula ⑬ | Ex. 10 Formula ⑤ | Ex. 11 Formula ⑪ | Ex. 12 Formula ⑤, ⑩ | Ex. 13 Formula ⑤, ⑫ | Comp. Ex. 2 Formula ⑭ | Comp. Ex. 3 Formula ⑤, ⑮ |
|---|---|---|---|---|---|---|---|---|
| High polymer liquid crystals |  |  |  |  |  |  |  |  |
| l | 28 | 0 | 44 | 0 | 44 | 44 | 80 | 400 |
| m | 83 | 100 | 230 | 100 | 230 | 230 | 20 | 800 |
| n | 6 | — | 3 | — | 3 | 3 | — | — |
| p | 2 | 3 | 3 | 3 | — | 3 | — | — |
| Solvents | Chloroform | Chloroform | Chloroform | Chloroform | Chloroform | 1,2-dichloroethane | Chloroform | 1,2-dichloroform |
| Concentration of high polymer liquid crystals (wt %) | 3.0 | 3.0 | 2.5 | 3.0 | Formula 5; 2.5 Formula 10; 0.5 | Formula 5; 1.5 Formula 12; 1.5 | 2.0 | Formula 5; 3.0 Formula 15; 2.5 |
| Dyestuff | Included | Included | Included | Included | Included | Included | Not included | Not included |
| Concentration of dyestuff based on high polymer liquid crystals (wt %) | 10 | 10 | 10 | 10 | 10 | 10 | — | — |
| Reflection film | None | None | None | Present | Present | Present | None | None |
| Reflection film materials | — | — | — | Al | Al | Al-Naphtalocyanine | — | — |
| Thickness of reflection film (μm) | — | — | — | 0.11 | 0.11 | 0.08 | — | — |
| Transparent substrate | Epoxy | Epoxy | Epoxy | Epoxy | Epoxy | Epoxy | Epoxy | Acryl |
| Groove in transparent substrate | Existed | Existed | Existed | Existed | Existed | Existed | Existed | None |

TABLE 5-continued
| | Ex. 8 Formula 1 | Ex. 9 Formula 13 | Ex. 10 Formula 5 | Ex. 11 Formula 11 | Ex. 12 Formula 5, 10 | Ex. 13 Formula 5, 12 | Comp. Ex. 2 Formula 14 | Comp. Ex. 3 Formula 5, 15 |
|---|---|---|---|---|---|---|---|---|
| Reflectance (%) | | | | | | | | |
| Prior to recording | 9 | 8 | 11 | 39 | 12 | 9 | 55 | 23 |
| When recorded | 21 | 12 | 22 | 61 | 28 | 18 | 55 | 22 |
| After erasion | 9 | 8 | 11 | 39 | 12 | 9 | 55 | 23 |
| Reflectance (%) after 300 times repetition | | | | | | | | |
| Prior to recording | 8 | 7 | 11 | 38 | 12 | 9 | 55 | 23 |
| When recorded | 20 | 11 | 22 | 60 | 28 | 18 | 55 | 22 |
| After erasion | 8 | 7 | 11 | 38 | 12 | 9 | 55 | 23 |
TABLE 6
(High polymer liquid crystals)
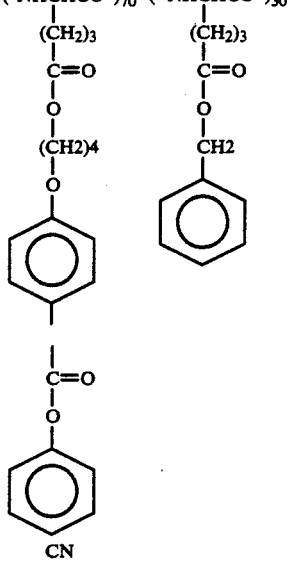
(1)
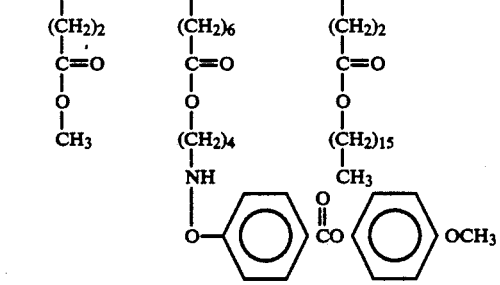
(2)
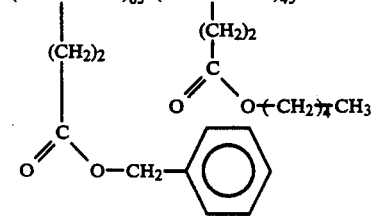
(6)

TABLE 6-continued
(High polymer liquid crystals)
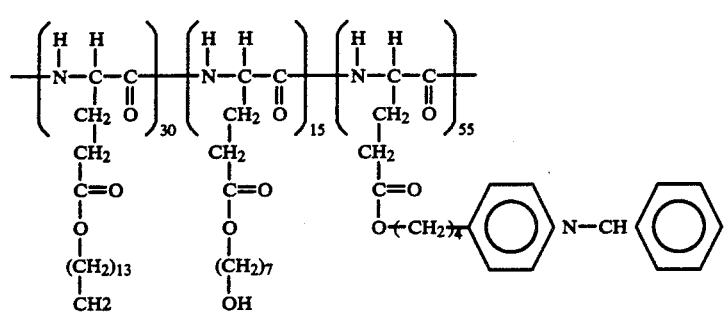
(3)
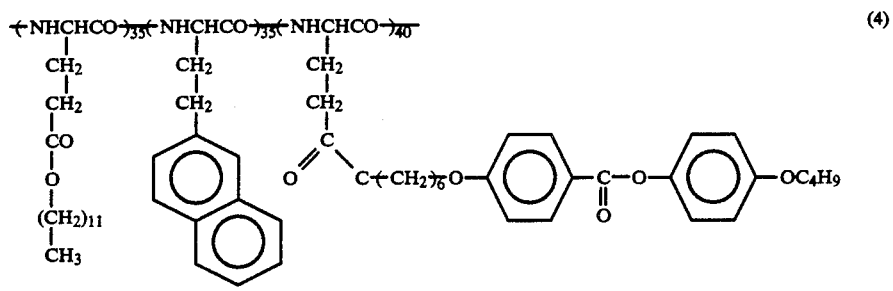
(4)
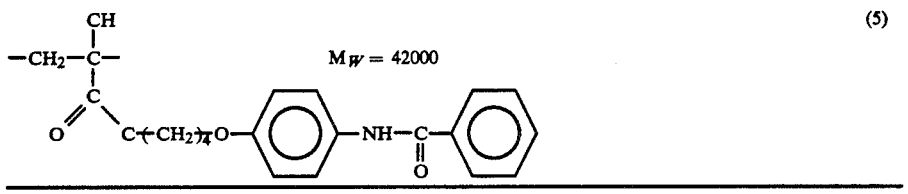
(5)
TABLE 7
(dyestuff)
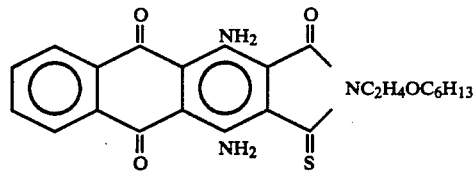
(7)
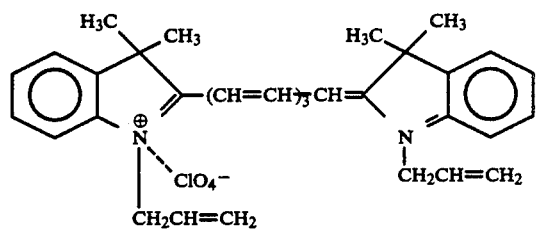
(8)
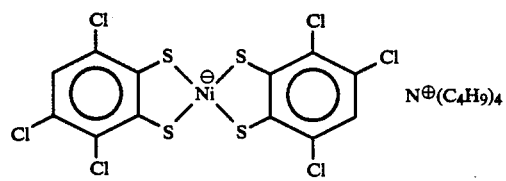
(9)

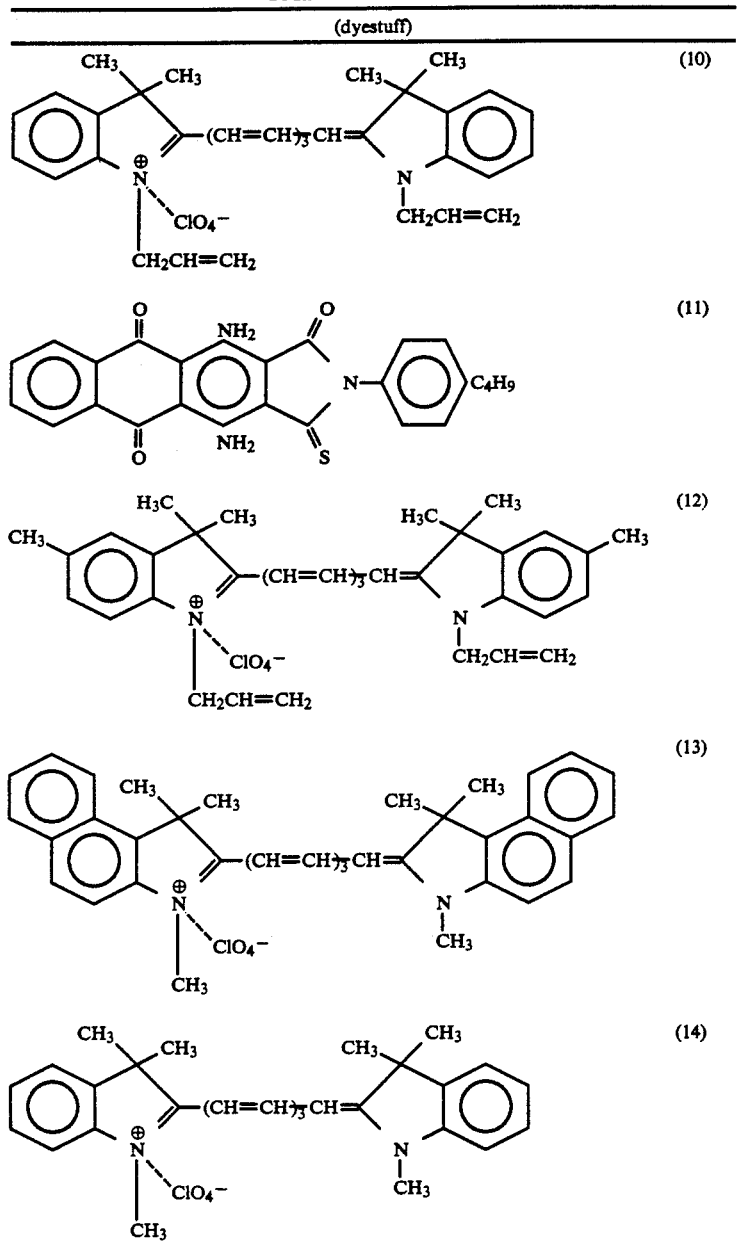
TABLE 8
|  | Example | | | | Comparative Ex. | |
| --- | --- | --- | --- | --- | --- | --- |
|  | 14 | 15 | 16 | 17 | 4 | 5 |
| Reflectance (%) | | | | | | |
| Before recording | 14 | 68 | 62 | 58 | 18 | 58 |
| After recording | 25 | 83 | 86 | 70 | 27 | 54 |
| After erasion | 14 | 66 | 62 | 59 | 19 | 58 |
| After 1000 times | | | | | | |
| Before recording | 12 | 66 | 62 | 59 | 17 | 61 |
| After recording | 21 | 82 | 85 | 71 | 26 | 64 |
| After erasion | 11 | 66 | 62 | 59 | 18 | 61 |
| C/N ratio (dB) | 45 | 48 | 48 | 51 | 42 | 40 |
| Erasion ratio (dB) | −27 | −29 | −31 | −30 | −17 | −11 |

TABLE 9
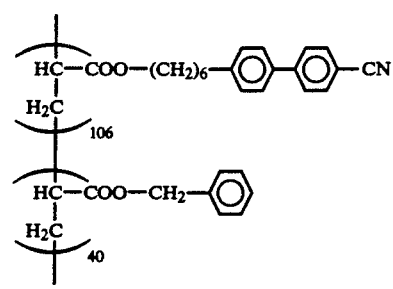
①
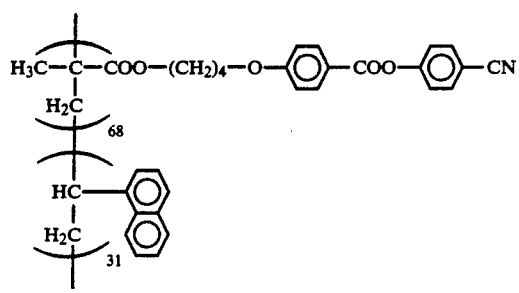
②
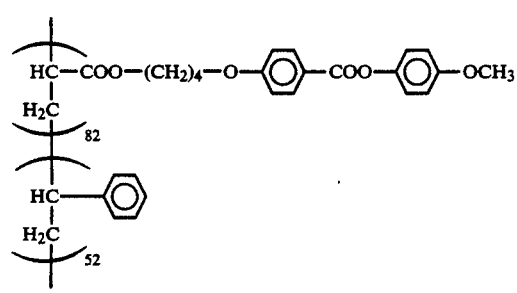
③
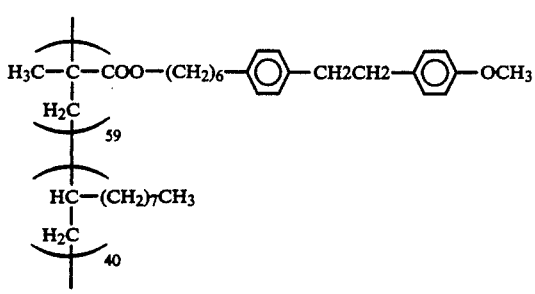
④
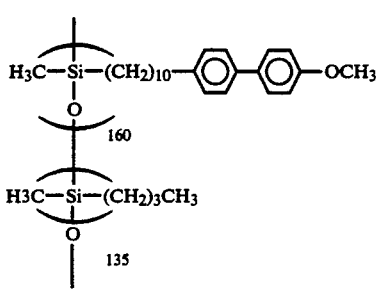
⑤
TABLE 9-continued
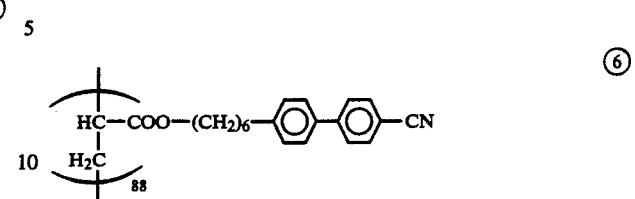
⑥
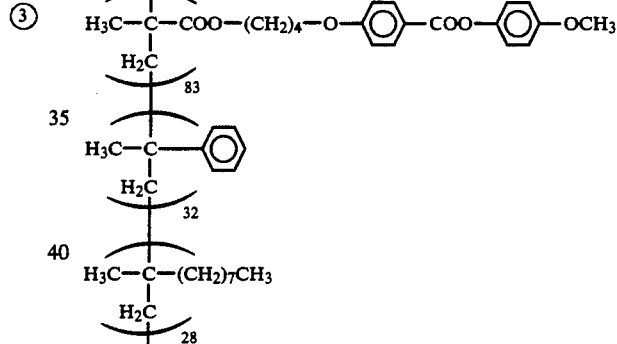
⑦
⑧
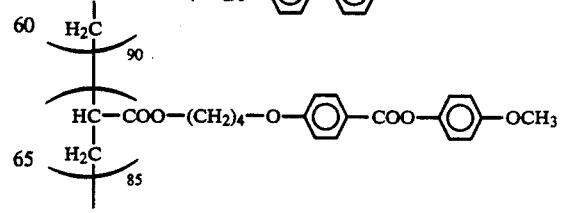
⑨

TABLE 10
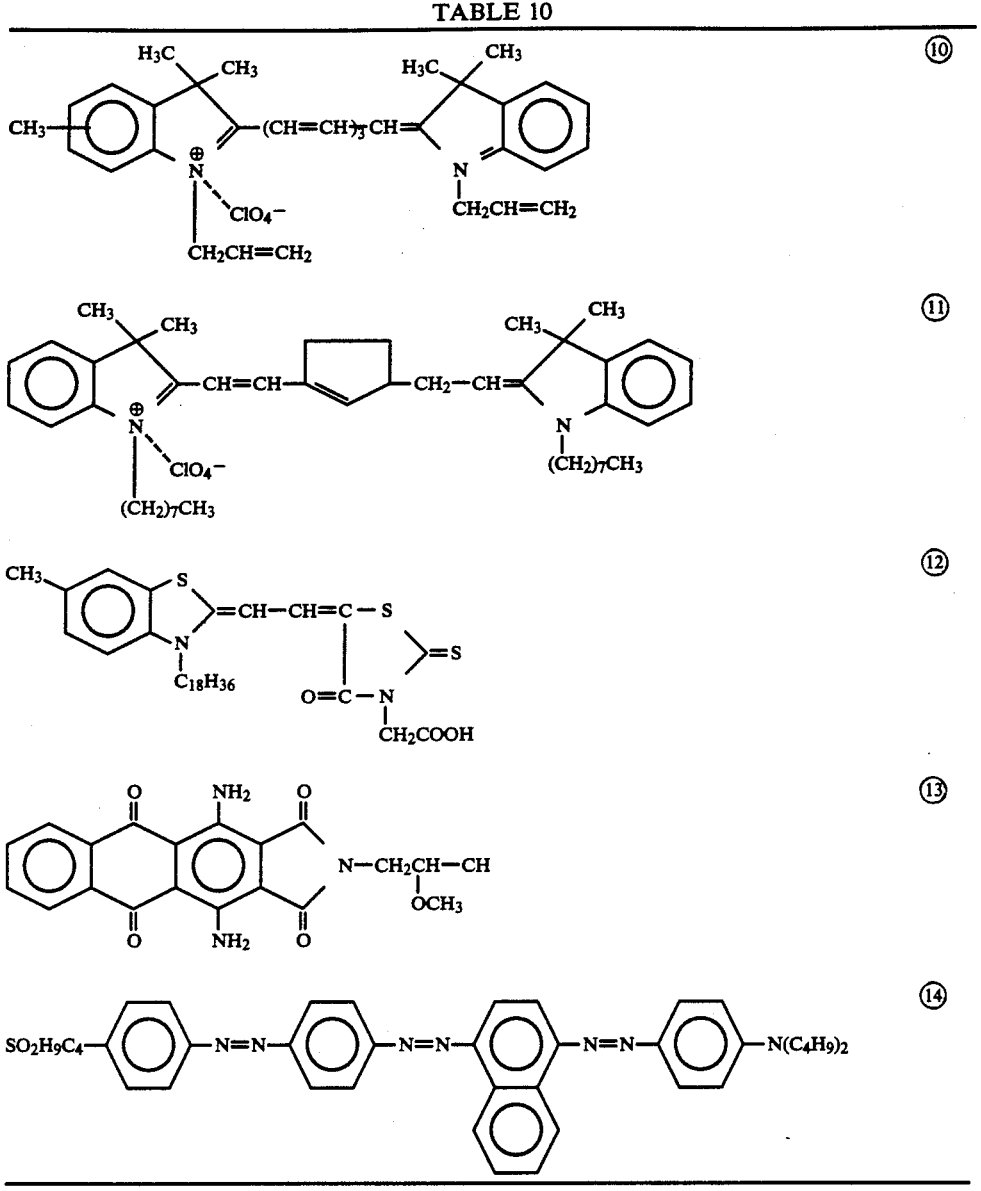
TABLE 11
|  | Example |  |  |  |  | Comparative Example |  |
|---|---|---|---|---|---|---|---|
|  | 18 | 19 | 20 | 21 | 22 | 6 | 7 |
| Reflectance (%) | | | | | | | |
| Before recording | 40 | 53 | 42 | 42 | 52 | 32 | 44 |
| After recording | 55 | 72 | 58 | 55 | 77 | 41 | 54 |
| After erasion | 41 | 54 | 43 | 43 | 52 | 33 | 45 |
TABLE 11-continued
|  | Example |  |  |  |  | Comparative Example |  |
|---|---|---|---|---|---|---|---|
|  | 18 | 19 | 20 | 21 | 22 | 6 | 7 |
| After 1000 times | | | | | | | |
| Before recording | 42 | 54 | 43 | 43 | 52 | 34 | 47 |
| After recording | 54 | 72 | 58 | 55 | 77 | 42 | 58 |
| After erasion | 42 | 54 | 43 | 43 | 52 | 34 | 47 |

TABLE 12
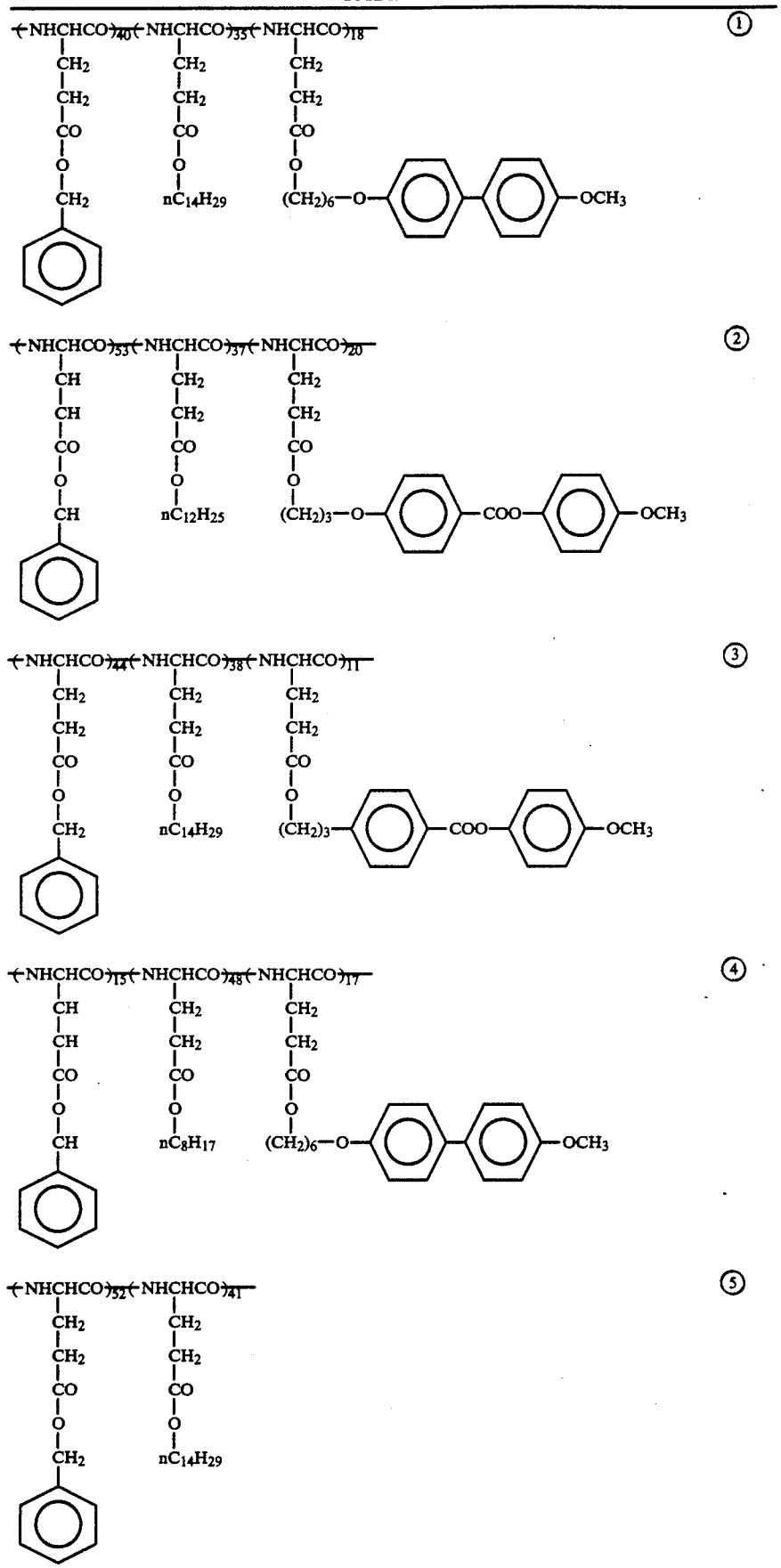

TABLE 12-continued
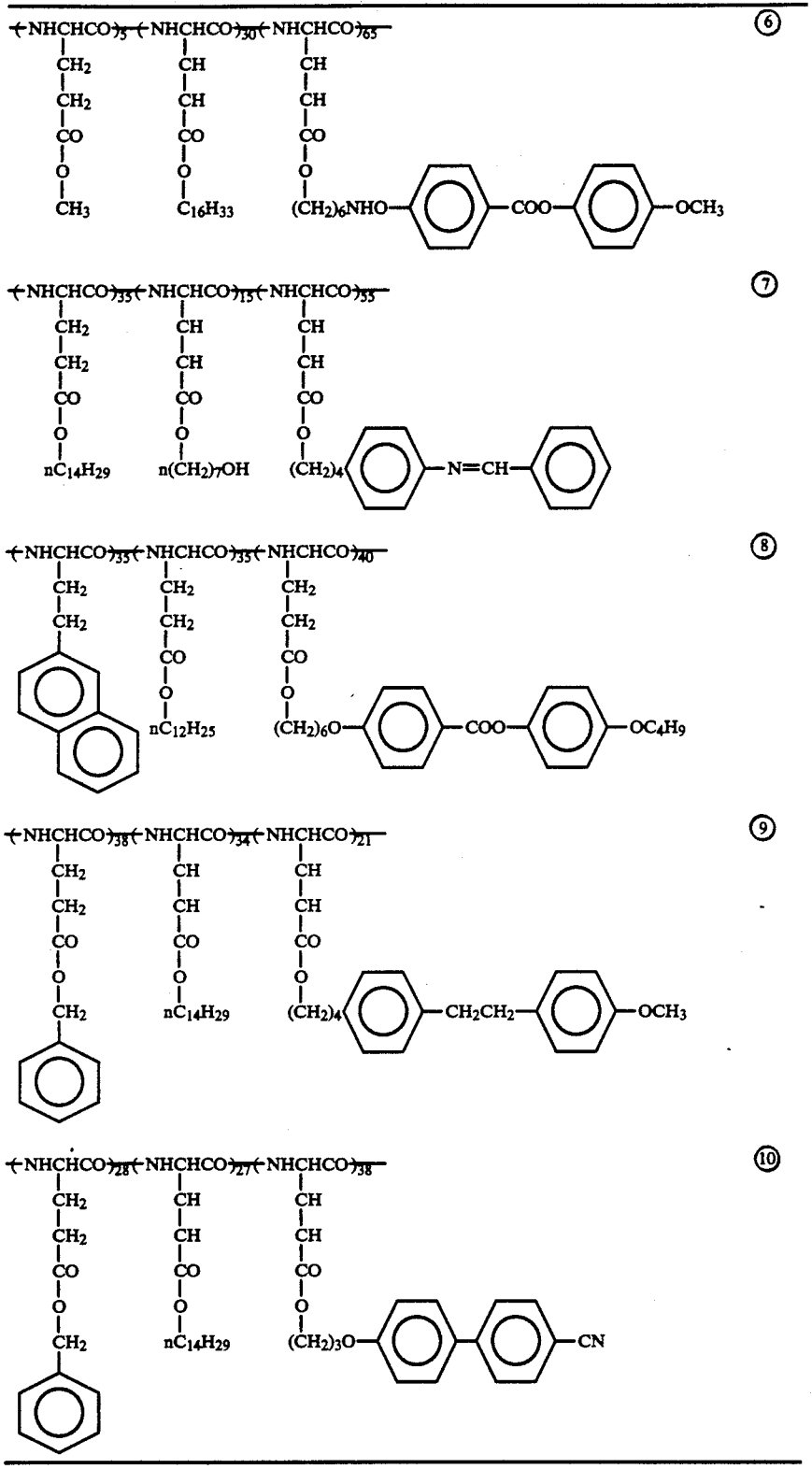
TABLE 13
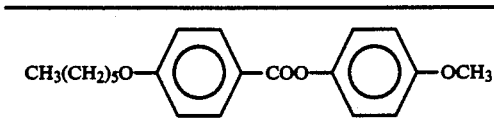
TABLE 13-continued
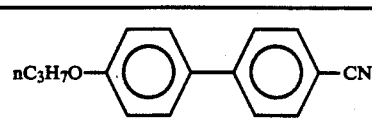

TABLE 13-continued
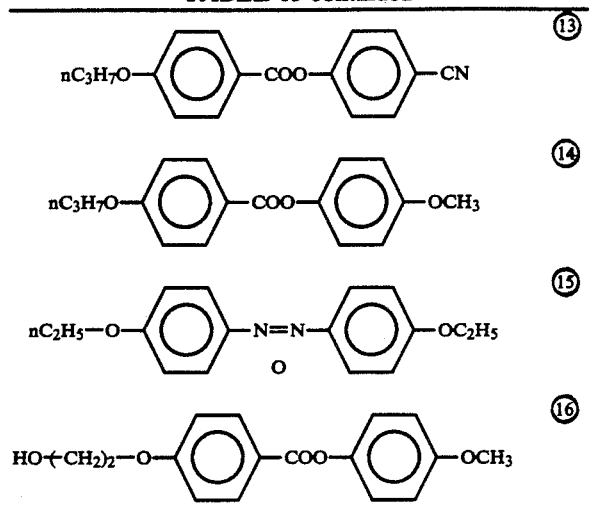
TABLE 13-continued
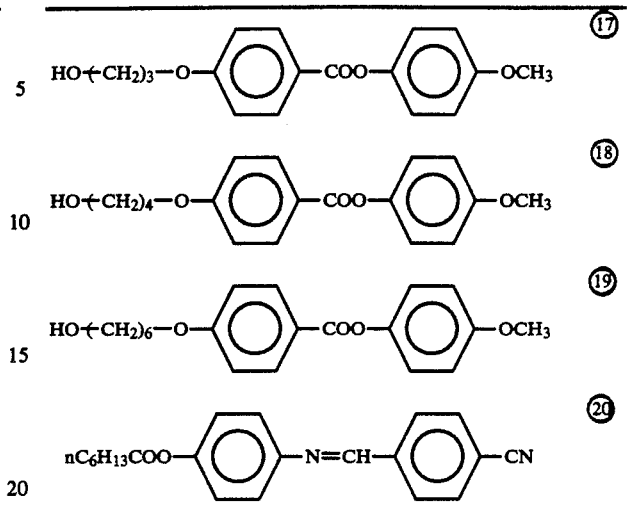
TABLE 14
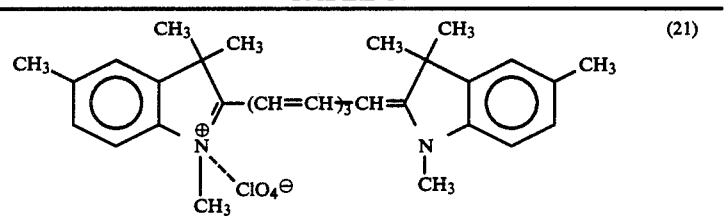
(21)
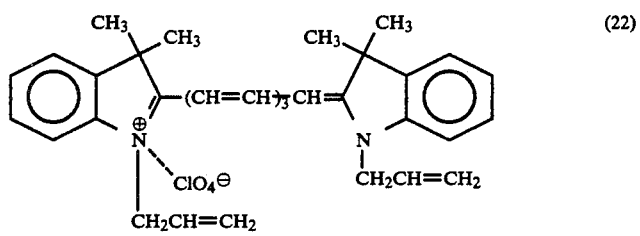
(22)
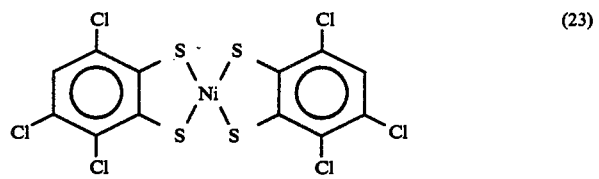
(23)
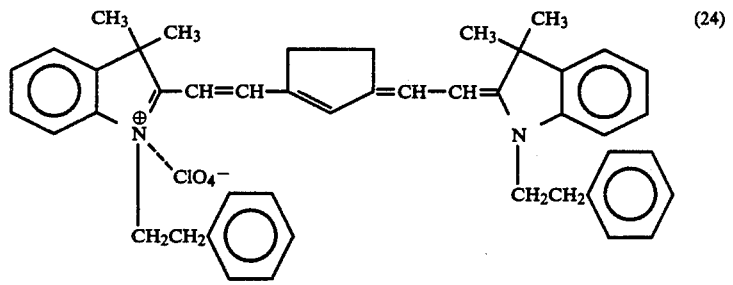
(24)
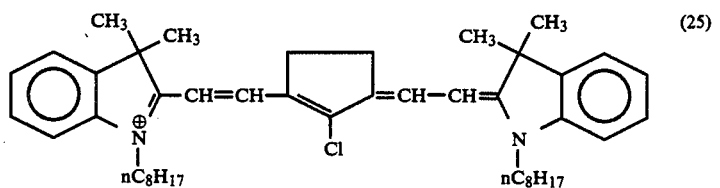
(25)

TABLE 14-continued

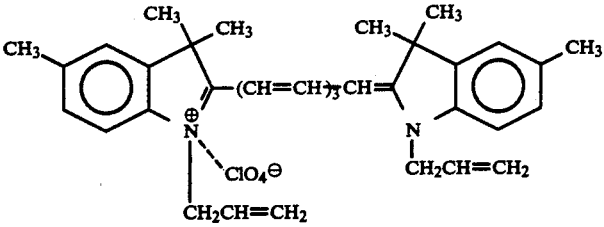

TABLE 15

| | Polyglutamate deriratives | Low molecular liquid crystal | Dyestuff I | Dyestuff II | Dyestuff III | Substrate | Solvents |
|---|---|---|---|---|---|---|---|
| Example | | | | | | | |
| 23 | ① | ⑪ | ㉑ | — | — | Grooved polycarbonate | Chloroform |
| 24 | ② | ⑫ | ㉒ | — | — | Grooved polycarbonate | " |
| 25 | ③ | ⑬ | ㉖ | ㉓ | — | Grooved epoxy | Chloroform toluene = 9:1 |
| 26 | ④ | ⑭ | ㉑ | ㉓ | — | Grooved epoxy | Cholorform |
| 27 | ⑤ | ⑬ | ㉖ | ㉓ | — | Grooved epoxy | Chloroform toluene = 9:1 |
| 28 | ⑥ | ⑮ | ㉖ | ㉓ | — | Grooved epoxy | Chloroform toluene = 9:1 |
| 29 | ⑦ | ⑮ | ㉕ | ㉓ | — | Grooved epoxy | Chloroform toluene = 9:1 |
| 30 | ⑧ | ⑳ | ㉕ | ㉖ | ㉓ | Grooved epoxy | Chloroform toluene = 9:1 |
| 31 | ⑨ | ⑰ | ㉗ | ㉓ | — | Grooved epoxy | Chloroform |
| 32 | ⑩ | ⑳ | ㉔ | ㉖ | ㉓ | Grooved epoxy | Chloroform ethylacetate = 9:1 |
| Comparative Example | | | | | | | |
| 8 | ① | — | ㉑ | — | — | Grooved epoxy | Chloroform |
| 9 | ⑤ | — | ㉖ | ㉓ | — | Grooved epoxy | " |
| 10 | ⑤ | — | ㉗ | — | — | Grooved epoxy | " |

| | Over coat | Reflection film | 1st recording (dB) | 1st erasing (dB) | Recording after 1000 times | Erasing after 1000 times |
|---|---|---|---|---|---|---|
| Example | | | | | | |
| 23 | SiO | Al | −54 | −16 | −51 | −17 |
| 24 | SiO | Al | −56 | −17 | −53 | −18 |
| 25 | SiO | Al | −57 | −19 | −56 | −19 |
| 26 | SiO | Al | −47 | −15 | −42 | −17 |
| 27 | SiO | Al | −48 | −17 | −46 | −17 |
| 28 | SiO | Al | −47 | −20 | −42 | −25 |
| 29 | SiO | Al | −51 | −16 | −49 | −16 |
| 30 | — | Al-Naphthocyanine | −48 | −17 | −43 | −19 |
| 31 | SiO | Al | −45 | −20 | −40 | −25 |
| 32 | SiO | Al | −50 | −15 | −49 | −15 |
| Comparative Example | | | | | | |
| 8 | SiO | Al | −48 | −20 | −47 | −22 |

TABLE 15-continued

| | | | | | | |
|---|---|---|---|---|---|---|
| 9 | SiO | Al | −40 | −22 | −38 | −25 |
| 10 | SiO | Al | −40 | −25 | −35 | −28 |

TABLE 16

(1)

$$\left(\begin{array}{c}\text{HC}-\text{COO}-(\text{CH}_2)_6-\phantom{}\!\!\!\bigcirc\!\!\!-\!\!\!\bigcirc\!\!\!-\text{CN}\\ \text{H}_2\text{C}\end{array}\right)_{106}\left(\begin{array}{c}\text{HC}-\text{COO}-\text{CH}_2-\!\!\!\bigcirc\\ \text{H}_2\text{C}\end{array}\right)_{40}$$

(2)

$$\left(\begin{array}{c}\text{HC}-\text{COO}-(\text{CH}_2)_4-\text{O}-\!\!\!\bigcirc\!\!\!-\text{COO}-\!\!\!\bigcirc\!\!\!-\text{OCH}_3\\ \text{H}_2\text{C}\end{array}\right)_{82}\left(\begin{array}{c}\text{HC}\\ \text{H}_2\text{C}-\!\!\!\bigcirc\end{array}\right)_{52}$$

(3)

$$\left(\begin{array}{c}\text{H}_3\text{C}-\text{Si}-(\text{CH}_2)_{10}-\!\!\!\bigcirc\!\!\!-\!\!\!\bigcirc\!\!\!-\text{OCH}_3\\ \text{O}\end{array}\right)_{160}\left(\begin{array}{c}\text{H}_3\text{C}-\text{Si}-(\text{CH}_2)_3\text{CH}_3\\ \text{O}\end{array}\right)_{135}$$

TABLE 16-continued (4)

$$\left(\begin{array}{c}\text{NH}\\ \text{CH}-(\text{CH}_2)_2-\text{C}-(\text{CH}_2)_6-\!\!\!\bigcirc\!\!\!-\text{CH}=\text{CH}-\!\!\!\bigcirc\!\!\!-\text{OCH}_3\\ \text{CO}\quad\quad\quad\text{O}\end{array}\right)_{10}$$
$$\left(\begin{array}{c}\text{NH}\\ \text{CH}-(\text{CH}_2)_2-\text{C}-(\text{CH}_2)_{12}\text{CH}_3\\ \text{CO}\quad\quad\quad\text{O}\end{array}\right)_{15}$$
$$\left(\begin{array}{c}\text{NH}\\ \text{CH}-(\text{CH}_2)_2-\text{C}-\text{CH}_2-\!\!\!\bigcirc\\ \text{CO}\quad\quad\quad\text{O}\end{array}\right)$$

(5)

$$\left[(\text{CH}_2)_6\text{O}-\!\!\!\bigcirc\!\!\!-\!\!\!\bigcirc\!\!\!-\text{O}-(\text{CH}_2)_6\text{O}\overset{\text{O}}{\text{C}}-(\text{CH}_2)_n\text{COO}\right]_m$$

n = 4, 6, 8

TABLE 17

(6)

$$n\text{C}_6\text{H}_{13}\text{O}-\!\!\!\bigcirc\!\!\!-\text{COO}-\!\!\!\bigcirc\!\!\!-\text{OCH}_3$$

(7)

$$n\text{C}_3\text{H}_7\text{O}-\!\!\!\bigcirc\!\!\!-\!\!\!\bigcirc\!\!\!-\text{CN}$$

(8)

$$n\text{C}_3\text{H}_7\text{O}-\!\!\!\bigcirc\!\!\!-\text{COO}-\!\!\!\bigcirc\!\!\!-\text{CN}$$

(9)

$$n\text{C}_2\text{H}_5\text{O}-\!\!\!\bigcirc\!\!\!-\text{N}=\text{N}-\!\!\!\bigcirc\!\!\!-\text{OC}_2\text{H}_5$$
$$\text{O}$$

(10)

$$\text{HO}-(\text{CH}_2)_6-\text{O}-\!\!\!\bigcirc\!\!\!-\text{COO}-\!\!\!\bigcirc\!\!\!-\text{OCH}_3$$

TABLE 18

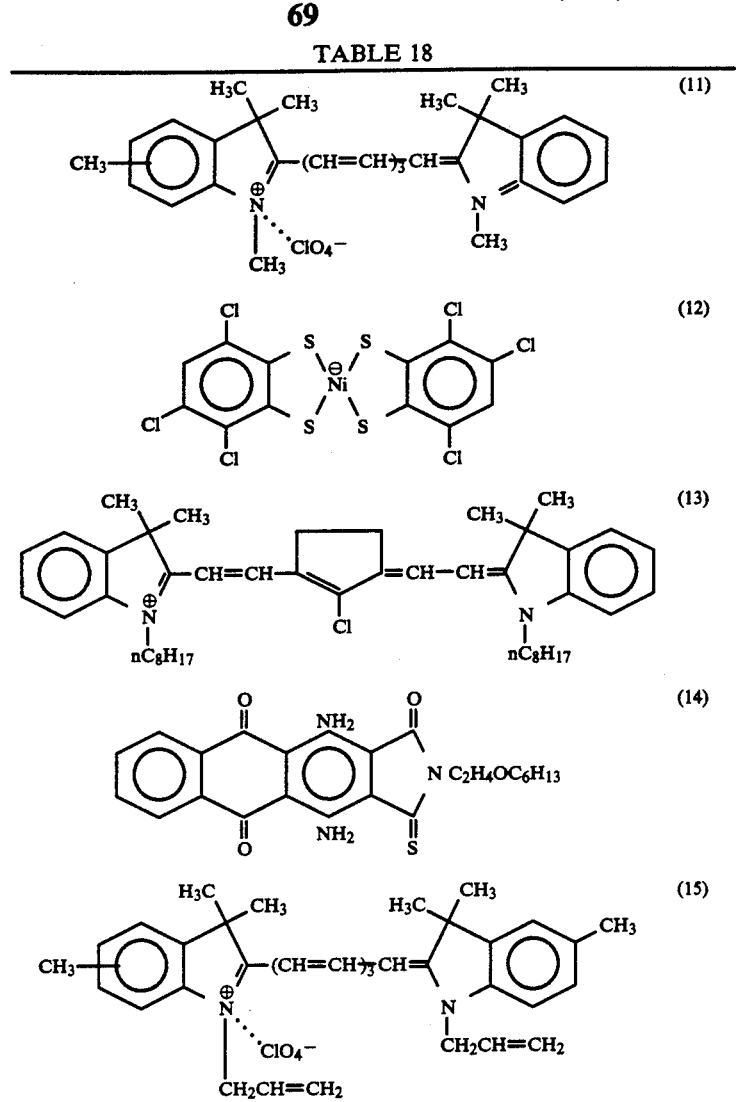

TABLE 19

| | High polymer liquid crystals | Low molecular liquid crystal | Dye-stuff | Substrate | Under-coat layer | Over-coat layer | Reflection layer | Change in reflection | At the beginning C/N ratio | Erasing ratio | After 1000 times C/N ratio | Erasing ratio |
|---|---|---|---|---|---|---|---|---|---|---|---|---|
| Example | | | | | | | | | | | | |
| 33 | ① | ⑥ | ⑪ | Epoxy | SiO | SiO | Al | 41 → 46 | 45 | −21 | 43 | −20 |
| 34 | ② | ⑦ | ⑫ | Epoxy | Poly-imide | Poly-imide | Al | 44 → 58 | 46 | −20 | 45 | −19 |
| 35 | ③ | ⑧ | ⑬ | Acryl | — | Poly-imide | Al | 43 → 60 | 46 | −21 | 44 | −21 |
| 36 | ④ | ⑨ | ⑭ | Glass | Si₃N₄ | Si₃N₄ | Au | 51 → 68 | 47 | −22 | 45 | −20 |
| 37 | ⑤ | ⑩ | ⑮ | Acryl | SiO | SiO | Au | 54 → 72 | 46 | −20 | 46 | −22 |
| Comparative Example | | | | | | | | | | | | |
| 11 | ① | — | ⑪ | Epoxy | — | — | Al | 46 → 55 | 44 | −9 | 36 | −7 |
| 12 | ② | — | ⑮ | Glass | SiO | SiO | Al | 43 → 54 | 42 | −8 | 38 | −6 |

What is claimed is:

1. An optical recording medium which has no electrode layer and comprises:
a transparent substrate; and
a recording layer, formed on said transparent substrate, and comprising at least one type of a liquid crystal polymer compound having side chain groups provided with molecular rotation power or power of changing a state such as an agglomeration or an arrangement, and a dye compound having absorbing power for recording light,
wherein upon radiation of recording light on said recording layer, affinity and association between the polymer compound and the dye compound are induced or dissociation and separation of the dye compound from the polymer compound are induced due to differences in chemical and physical characteristics such as a glass transition point and a melting point between the side chain groups of said polymer compound and said dye compound thereby to enclose said dye compound between regularly arranged side chain groups of said polymer compound and to change optical characteristics of the recording medium, thereby accumulating/erasing optical information and reading the optical information by utilizing the optical changes.

2. A medium according to claim 1, wherein said polymer compound is a single or composite compound.

3. A medium according to claim 1, wherein said dye compound is a single or composite compound and said dye compound has an absorption peak in a wavelength range of recording light.

4. A medium according to claim 1, wherein said liquid crystal polymer compound is a side chain type liquid crystal polymer represented by following formula (I), which has a mesogen group at side chain portions Y and Y' thereof via a flexible spacer, and has $$-CH-CH_2-, \quad -\overset{CH_3}{\underset{|}{C}}-CH_2, \quad -O-Si-, \text{ and}$$

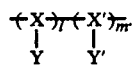

$n=2$ to 9, at backbone portions X and X':

 (I)

wherein $30 \leq l+m \leq 5,000$ and $l/m = 10$ to $100/90$ to 0.

5. A medium according to claim 4, wherein said liquid crystal polymer exhibits liquid crystallinity at a temperature from 40° C. to 350° C.

6. A medium according to claim 4, wherein said recording layer consists essentially of a liquid crystal polymer and a laser-light absorbing dye.

7. A medium according to claim 4, wherein no auxiliary electric field is required for recording or erasure.

8. A medium according to claim 1, wherein said liquid crystal polymer compound is a polypeptide-based polymer liquid crystal having a liquid crystal functional group at a side chain thereof.

9. A medium according to claim 1, wherein a reflecting film is formed on said recording layer.

10. A medium according to claim 1, wherein a side chain group having a structure in which a spatial structure is obtained between side chain groups so that suitable miscibility with said dye compound is obtained or said dye compound can easily enter between said side chain groups is introduced in said liquid crystal polymer compound 11. A medium according to claim 10, wherein said side chain group having a structure for forming a spatial structure is a monocyclic or polycyclic compound and is introduced in an amount of not less than 0.01 per side chain group.

12. A medium according to claim 1, wherein said side chain group having a structure for forming a spatial structure is an aliphatic compound having 1 to 18 carbon atoms or an aryl having up to 18 carbon atoms and is introduced in an amount of not less than 0.01 per side chain group.

13. A medium according to claim 1, wherein said dye compound is a cyanine-based dyestuff represented by the following formula

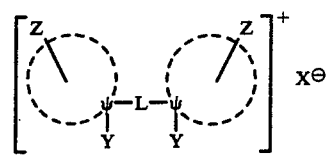

wherein $\psi$, L, X, Y and Z are as follows:

$\psi$ is 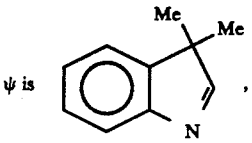

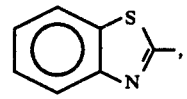

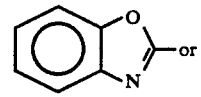 or

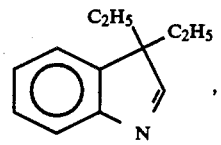

L is $-CH=CH\ CH=$ wherein n is an integer of 1 to 3,

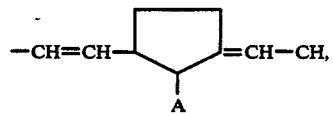

wherein A is Cl, F or Br,

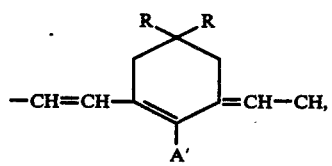

wherein A' is Cl, F or Br or

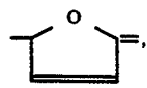

X is $I^\ominus$, $ClO_4^\ominus$, $BSF^\ominus$, $Br^\ominus$ or $BF_4^\ominus$;
Y is $C_{n_1}H_{2n_1+1}$, $n_1 = 1$ to 18, $C_{n_2}H_{2n_2}OC_mH_{2m+1}$, $n_2, m = 1$ to 18, $(CH_2)_{n_3}R$, $n_3 =$ zero to 18,

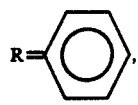

R=SO₃Na, SO₃H or $C_{n_4}H_{2n_4-1}C_{m_1}H_{2m_1}$, $n_4$ $m_1$=1 to 18;

Z is —X (halogen), —R (alkyl), —ROH, —RCOH, —RCOOH, —ROR', —RCOR', —RCOOR',

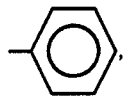

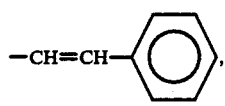

—CH=CH—CN, —OCF₃ or —OSF₃.

14. A medium according to claim 1, wherein said dye compound is a merocyanine-based dyestuff represented by the following formula

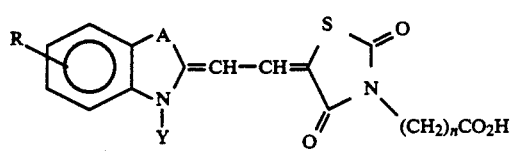

wherein,
R=H, CH₃, X (halogen) or $OC_mH_{2m+1}$, m=1 to 3;
A=S or Se;
n=1 to 6

15. A medium according to claim 1, wherein said dye compound is an arylazo-based dyestuff represented by the following formula

X—N=N—Y—N=N—Z wherein,

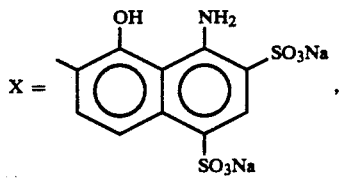

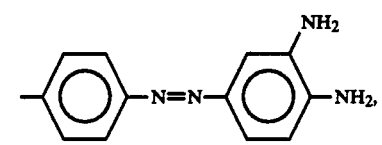

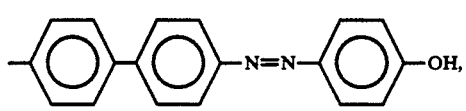

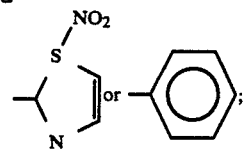

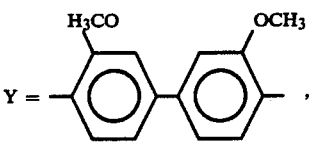

Y=

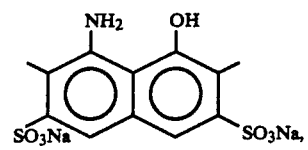

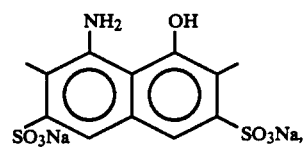

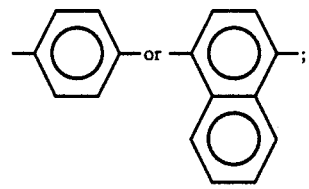

Z=

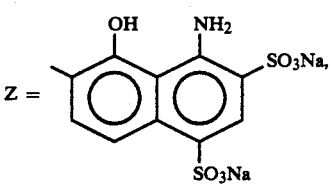

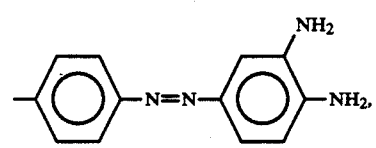

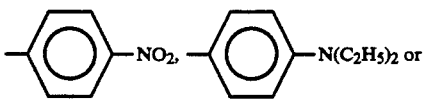

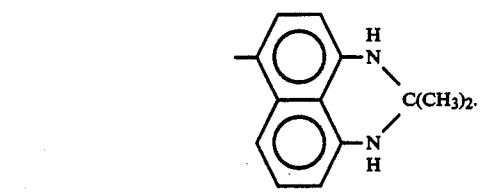

16. A medium according to claim 11, wherein said side chain having a structure for forming a spatial structure is selected from the group consisting of phenyl, benzyl, naphthyl and anthryl.

17. A medium according to claim 12, wherein the aliphatic compound is an alkyl having 1 to 18 carbon atoms.

* * * * *